(12) United States Patent
Nakamura et al.

(10) Patent No.: US 8,225,059 B2
(45) Date of Patent: Jul. 17, 2012

(54) REMOTE COPY SYSTEM AND REMOTE COPY CONTROL METHOD

(75) Inventors: Sadahiro Nakamura, Fujisawa (JP); Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 341 days.

(21) Appl. No.: 12/577,627

(22) Filed: Oct. 12, 2009

(65) Prior Publication Data
US 2011/0029748 A1    Feb. 3, 2011

(30) Foreign Application Priority Data
Jul. 30, 2009  (JP) .................................. 2009-177337

(51) Int. Cl.
*G06F 12/00* (2006.01)
(52) U.S. Cl. . 711/162; 711/158; 711/161; 707/999.202; 707/999.204
(58) Field of Classification Search .................. 711/161, 711/158, 162; 707/999.202, 999.204
See application file for complete search history.

(56) References Cited

U.S. PATENT DOCUMENTS

| | | | |
|---|---|---|---|
| 7,185,228 B2 * | 2/2007 | Achiwa | 714/20 |
| 2007/0168404 A1 | 7/2007 | Nakamura et al. | |
| 2007/0198605 A1 | 8/2007 | Saika | |

FOREIGN PATENT DOCUMENTS

| | | |
|---|---|---|
| JP | 2007-193451 | 8/2007 |
| JP | 2007-219609 | 8/2007 |

* cited by examiner

*Primary Examiner* — Kevin Ellis
*Assistant Examiner* — Mehdi Namazi
(74) *Attorney, Agent, or Firm* — Foley & Lardner LLP

(57) ABSTRACT

Proposed are a remote copy system and a remote copy control method capable of performing the operation of remote copy according to the user's usage status. Resource information representing a resource usage status is collected from a first storage apparatus installed at a primary site and a second storage apparatus installed respectively at one or more secondary sites, a transfer mode of differential data between snapshots to be transferred from the first storage apparatus to the second storage apparatus based on the collected resource information, and the first and second storage apparatuses are controlled so as to transfer the differential data from the first storage apparatus to the second storage apparatus based on the decided transfer mode.

12 Claims, 37 Drawing Sheets

FIG. 3

| PAIR NAME | SITE TYPE | SITE INFORMATION | | | | RETAINED SNAPSHOT | | |
|---|---|---|---|---|---|---|---|---|
| | | HOST NAME | PORT NUMBER | FS NAME | | OLDEST | ... | NEWEST |
| Pair01 | PRIMARY SITE | 192.168.12.34 | 50 | FS01 | | SS01 | ... | SS05 |
| | SECONDARY SITE 1 | 192.168.30.34 | 50 | FS02 | | SS01 | SS02 | — |
| ... | ... | ... | ... | ... | | ... | SS03 | — |
| | SECONDARY SITE N | 10.230.56.12 | 50 | FS16 | | SS01 | SS02 | — |
| ... | ... | ... | ... | ... | | ... | ... | ... |

| PAIR NAME | SITE TYPE | COPY SOURCE INFORMATION | COPY MODE | COPY STATUS | Baseline | Copying | COPY-TARGET SNAPSHOT | | |
|---|---|---|---|---|---|---|---|---|---|
| | | HOST NAME | | | | | FIRST | ... | LAST |
| Pair01 | SECONDARY SITE 1 | 192.168.12.34 | A | COPYING | SS03 | SS04 | SS04 | SS05 | — |
| .. | .. | .. | .. | .. | .. | .. | .. | .. | .. |
| .. | SECONDARY SITE N | 192.168.12.34 | A | COPYING | SS02 | SS03 | SS03 | SS04 | SS05 |
| .. | .. | .. | .. | .. | .. | .. | .. | .. | .. |
| 220 | 222 | 224 | 226 | 228 | 230 | 232 | 234 | | |

| PAIR NAME | SITE TYPE | SITE STATUS | SITE SPEC ||||||||
|---|---|---|---|---|---|---|---|---|---|---|
| | | | CPU UTILIZATION | MEMORY (MB) || DISK WRITE (MB/s) || DISK READ (MB/s) ||
| | | | | USAGE | UPPER LIMIT | USAGE | UPPER LIMIT | USAGE | UPPER LIMIT |
| Pair01 | PRIMARY SITE | Available | 10 | 200 | 4096 | 30 | 100 | 2 | 100 |
| | SECONDARY SITE 1 | Available | 20 | 500 | 1024 | 30 | 200 | 100 | 200 |
| | SECONDARY SITE N | Down | - | - | 2048 | - | 100 | - | 100 |
| .. | .. | | | .. | .. | | .. | | .. |

240 — PAIR NAME
242 — SITE TYPE
244 — SITE STATUS
246 — SITE SPEC
248 — CPU UTILIZATION
250 — MEMORY
252 — DISK WRITE
254 — DISK READ

FIG. 5B

| PAIR NAME (260) | SITE TYPE (262) | INTER-SITE NETWORK BAND (264) ||||||
|---|---|---|---|---|---|---|---|
| | | PRIMARY SITE (266) || SECONDARY SITE 1 (268) || ... | SECONDARY SITE N (268) ||
| | | USAGE | UPPER LIMIT | USAGE | UPPER LIMIT | USAGE / UPPER LIMIT | USAGE | UPPER LIMIT |
| Pair01 | PRIMARY SITE | — | — | — | — | ∴ ∴ | — | — |
| | SECONDARY SITE 1 | 400 | 1024 | — | — | ∴ — | — | — |
| | ∴ | 1024 | 1024 | 300 | 1024 | — — | — | — |
| | SECONDARY SITE N | 128 | 128 | 128 | 128 | ∴ ∴ | — | — |
| ∴ | ∴ | ∴ | ∴ | ∴ | ∴ | ∴ ∴ | ∴ | ∴ |

| PAIR NAME | SITE TYPE | ACCESSIBLE USER COUNT | USER ACCESS FREQUENCY | FILE TYPE | IDENTICAL EXTENSION FILE OCCUPANCY RATIO |
|---|---|---|---|---|---|
| Pair01 | PRIMARY SITE | 1 | 8 | mpeg | 60 |
|  | SECONDARY SITE 1 | 400 | 2400 | — | — |
|  | ... | 1000 | 3110 | — | — |
|  | SECONDARY SITE N | 100 | 55 | — | — |
| .. | .. | .. | .. | .. | .. |
| 270 | 272 | 274 | 276 | 278 | 280 |

| | RESOURCE USAGE IN ONE REMOTE COPY ||||||
|---|---|---|---|---|---|
| | CPU UTILIZATION (%) | MEMORY (MB) | DISK WRITE (MB/s) | DISK READ (MB/s) | NETWORK BAND (MB/s) |
| PRIMARY SITE SIDE | 10 | 50 | 1 | 30 | 100 |
| SECONDARY SITE SIDE | 10 | 50 | 20 | 2 | 100 |
| | 290 | 292 | 294 | 296 | 298 |

FIG. 7

| # | EVALUATION ITEM | REMARKS |
|---|---|---|
| 1 | CPU USAGE | TAKES A VALUE BETWEEN 0% AND 100%. HIGHER VALUE SHOWS HIGHER NUMBER OF USER ACCESS. |
| 2 | MEMORY USAGE | MEMORY USAGE THAT IS BEING CONSUMED BY THE PROCESS RUNNING IN THE SITE. SHOWS HIGH NUMBER OF USER ACCESS. |
| 3 | DISK I/O AMOUNT OF TARGET FILE SYSTEM | TOTAL I/O AMOUNT GENERATED BY THE PROCESSING RUNNING IN THE SITE. SHOWS HIGH NUMBER OF USER ACCESS. IF I/O WAIT TIME IS LONG, SHOWS THAT PROCESSABLE I/O HAS PEAKED (REACHED ITS LIMIT). |
| 4 | NETWORK BAND USAGE BETWEEN RESPECTIVE SITES | AMOUNT OF DATA SEND AND RECEIVED PER SECOND FROM CORRESPONDING SITE TO DIFFERENT SITE. |
| 5 | NUMBER OF USERS PERMITTED ACCESS TO SITE | NUMBER OF USERS PERMITTED TO ACCESS THE SITE. |
| 6 | USER ACCESS FREQUENCY TO SITE | TOTAL NUMBER OF USER ACCESS DURING A GIVEN PERIOD OF TIME. |
| 7 | FILE TYPE (EXTENSION) | SHOWS FORMAT (EXTENSION) OF MAIN FILES STORED IN CORRESPONDING FILE SYSTEM. SINCE THIS INFORMATION IS THE SAME IN ALL SITES, IT WILL BE ACQUIRED ONLY FROM THE PRIMARY SITE. |
| 8 | IDENTICAL EXTENSION FILE OCCUPANCY RATIO FIELD | RATIO OF FILES HAVING THE EXTENSION SHOWN IN #7 IN THE CORRESPONDING FILE SYSTEM |

FIG. 8

| OPERATIONAL PURPOSE OF SECONDARY SITE | ACCESS FREQUENCY OF SECONDARY SITE | NUMBER OF SECONDARY SITE USERS | DATA TYPE | USAGE STATUS OF PRIMARY SITE |
|---|---|---|---|---|
| BACKUP | RARELY REFERRED TO. NOT REFERRED TO FOR CONFIRMATION OF BACKUP DATA. TRANSFER DESTINATION OF REFERENCE DATA IS MOSTLY PRIMARY SITE. | FEW ACCESSABLE USERS. PURPOSE OF MOST ACCESSES IS RESTORATION OF PRIMARY SITE. | ARCHIVE DATA, COMPRESSED FILE | MORE USERS ACCESS PRIMARY SITE THAN SECONDARY SITE. LOAD IS PRIMARY SITE > SECONDARY SITE. |
| MIRROR SITE | FREQUENCY ACCESSED. | MANY ACCESSABLE USERS. OR FREQUENTLY ACCESSED BY SPECIFIC HOST (WEB). | MAINLY STORES DATA (HTML, IMAGES, VIDEO, ETC.) THAT CAN BE EASILY REFERRED TO BY USERS. | MAINLY USED FOR CREATING NEW CONTENTS, AND ACCESSABLE USERS ARE LIMITED. THUS, LOAD IS SECONDARY SITE > PRIMARY SITE. |

| GENERATION NUMBER | SITE NAME |
|---|---|
| V4 | SECONDARY SITE 1 |

| GENERATION NUMBER | SITE NAME |
|---|---|
| V4 | SECONDARY SITE 1 |
| V3 | SECONDARY SITE 2 |
| V2 | SECONDARY SITE 2 |

| GENERATION NUMBER | SITE NAME |
|---|---|
| V4 | SECONDARY SITE 1 |
| V3 | SECONDARY SITE 2 |
| V2 | SECONDARY SITE 2 |
| V1 | SECONDARY SITE 3 |

FIG.18

<BACKUP>
NUMBER OF SECONDARY SITE USERS < NUMBER OF PRIMARY SITE USERS
SPECIDIED EXTENSION OCCUPANCY RATIO > 50%
SPECIFIED EXTENSION: TAR, ZIP, LZH

<BACKUP>
NUMBER OF SECONDARY SITE USERS > NUMBER OF PRIMARY SITE USERS
SPECIDIED EXTENSION OCCUPANCY RATIO > 50%
SPECIFIED EXTENSION: MPEG, JPEG, MP3, PDF

<DEFAULT>
BACKUP

FIG. 19

| CURRENT RESOURCE AVAILABILITY STATUS / DIFFERENTIAL DATA AMOUNT | LARGE | MEDIUM | SMALL |
|---|---|---|---|
| LARGE (100MB OR MORE) | NUMBER OF REPRESENTATIVE SECONDARY SITES = 3 | NUMBER OF REPRESENTATIVE SECONDARY SITES = 2 | NUMBER OF REPRESENTATIVE SECONDARY SITES = 1 |
| MEDIUM (10MB OR MORE, 100MB OR LESS) | NUMBER OF REPRESENTATIVE SECONDARY SITES = 3 | NUMBER OF REPRESENTATIVE SECONDARY SITES = 2 | NUMBER OF REPRESENTATIVE SECONDARY SITES = 1 |
| SMALL (10MB OR LESS) | NUMBER OF REPRESENTATIVE SECONDARY SITES = 3 | NUMBER OF REPRESENTATIVE SECONDARY SITES = 3 | NUMBER OF REPRESENTATIVE SECONDARY SITES = 2 |

<RESOURCE AVAILABILITY STATUS: LARGE>
(AVERAGE VALUE OF MEMORY USAGE < AVERAGE VALUE OF MEMORY SIZE (UPPER LIMIT) × 20%) AND
(AVERAGE VALUE OF DISK I/O AMOUNT < AVERAGE VALUE OF DISK I/O AMOUNT (UPPER LIMIT) × 20%) AND
(AVERAGE VALUE OF NETWORK BAND FIELD USAGE < AVERAGE VALUE OF NETWORK BAND FIELD USAGE (UPPER LIMIT) × 20%)

<RESOURCE AVAILABILITY STATUS: MEDIUM>
(AVERAGE VALUE OF MEMORY USAGE > AVERAGE VALUE OF MEMORY SIZE (UPPER LIMIT) × 50%) AND
(AVERAGE VALUE OF DISK I/O AMOUNT > AVERAGE VALUE OF DISK I/O AMOUNT (UPPER LIMIT) × 50%) AND
(AVERAGE VALUE OF NETWORK BAND FIELD USAGE > AVERAGE VALUE OF NETWORK BAND FIELD USAGE (UPPER LIMIT) × 50%)

<RESOURCE AVAILABILITY STATUS: SMALL>
(AVERAGE VALUE OF MEMORY USAGE > AVERAGE VALUE OF MEMORY SIZE (UPPER LIMIT) × 70%) AND
(AVERAGE VALUE OF DISK I/O AMOUNT > AVERAGE VALUE OF DISK I/O AMOUNT (UPPER LIMIT) × 70%) AND
(AVERAGE VALUE OF NETWORK BAND FIELD USAGE > AVERAGE VALUE OF NETWORK BAND FIELD USAGE (UPPER LIMIT) × 70%)

FIG. 27

| SITE | ACQUIRED INFORMATION | COPY SOURCE | COPY TARGET |
|---|---|---|---|
| PRIMARY SITE | V1, V2, V3, V4 | — | |
| SECONDARY SITE 1 | V1, V2, V3, V4 | — | |
| SECONDARY SITE 2 | V1, V2 | SECONDARY SITE 1 | V3, V4 |
| SECONDARY SITE 3 | V1 | SECONDARY SITE 1 OR 2 | V2, V3, V4 |

REMOTE COPY SYSTEM AND REMOTE COPY CONTROL METHOD

CROSS REFERENCES

This application relates to and claims priority from Japanese Patent Application No. 2009-177337, filed on Jul. 30, 2009, the entire disclosure of which is incorporated herein by reference.

BACKGROUND

The present invention relates to a remote copy system and a remote copy control method and, for instance, can be suitably applied to a storage system comprising a snapshot function.

Conventionally, snapshot has been used as one type of technology that is handled in a network storage such as a NAS (Network Attached Storage). Snapshot is technology of logically retaining a static data image of a primary volume (logical volume storing user data) at the point in time that a snapshot creation command was received. This snapshot is used when restoring a data image of the primary volume at the point in time that the snapshot was created when data of the primary volume is lost due to a man-caused error.

In addition, a remote copy system is known where, upon updating data of the primary volume, pre-update data is saved as differential data in a differential volume, and differential data saved in the differential volume is remote-copied to a storage apparatus installed in a secondary site. According to this remote copy system, even if the primary site including the primary volume is subject to a disaster, the data image of the primary volume can be restored by using the differential data that is retained in the storage apparatus of the secondary site.

As an example using the foregoing types of technologies, for instance, proposed is a snapshot management method which attempts to improve the user-friendliness of the user by periodically acquiring snapshots, detecting the degree of difference between two acquired snapshots, and, if the detected degree of difference is smaller than a predetermined threshold, deleting the snapshot that was acquired first of the two snapshots (refer to Japanese Patent Laid-Open Publication No. 2007-219609).

Moreover, proposed is a NAS system for appropriately remote-copying differential data of a snapshot based on a pre-scheduled remote copy start time by adjusting the Nth snapshot acquisition time or the Nth or (N+1)th remote copy start time so that the Nth remote copy ends before the (N+1)th remote copy start time (refer to Japanese Patent Laid-Open Publication No. 2007-193451).

SUMMARY

Meanwhile, as the system configuration for operating the remote copy, there is a configuration where the primary site and the secondary site are 1-to-1, and a configuration where the primary site and the secondary site are 1-to-N. With the system configuration where the primary site and the secondary site are 1-to-N, since there are a plurality of secondary sites, even if a fault occurs in the primary site in a state where one of the secondary sites is subject to a fault, the business operation can be continued based on another sound secondary site.

Meanwhile, as the operational purpose of the remote copy, in addition to a backup purpose of backing up data of the primary site, there is a mirror site purpose of using the secondary site as a mirror site in order to improve the user-friendliness of the user. Here, the user's access to the secondary site is not always constant, and there are time periods when the user access to the secondary site is concentrated, and time periods when there is hardly any user access to the secondary site.

Conventionally, since the operation method was not switched according to the user's usage status of the respective secondary sites upon operating the remote copy, the operation efficiency of the secondary site would sometimes deteriorate. For instance, in cases where the respective secondary sites are to be operated as the backup site of the primary site, if the respective secondary sites are operated as the mirror site, the user is unable to view the latest data due to the delay in the data transfer.

The present invention was devised in view of the foregoing points. Thus, an object of this invention is to propose a remote copy system and a remote copy control method capable of performing the operation of remote copy according to the user's usage status.

In order to achieve the foregoing object, the present invention provides a remote copy system comprising a first storage apparatus disposed in a primary site for providing to a host computer a first volume to be used for reading and writing data, and periodically or randomly creating a snapshot of the first volume, a second storage apparatus disposed respectively in one or more secondary sites for restoring a data image of the first volume to a second volume in a self-apparatus based on differential data between the snapshots that are transferred from the first storage apparatus, and a monitoring server for controlling a transfer mode of the differential data to be transferred from the first storage apparatus to the second storage apparatus. With this remote copy system, the monitoring server collects resource information representing a resource usage status from the first and second storage apparatuses, decides the transfer mode of the differential data to be transferred from the first storage apparatus to the second storage apparatus based on the collected resource information, and controls the first and second storage apparatuses so as to transfer the differential data from the first storage apparatus to the second storage apparatus according to the decided transfer mode.

The present invention additionally provides a remote copy control method in a remote copy system including a first storage apparatus disposed in a primary site for providing to a host computer a first volume to be used for reading and writing data, and periodically or randomly creating a snapshot of the first volume, and a second storage apparatus disposed respectively in one or more secondary sites for restoring a data image of the first volume to a second volume in a self-apparatus based on differential data between the snapshots that are transferred from the first storage apparatus. This remote copy control method comprises a first step of collecting resource information representing a resource usage status from the first and second storage apparatuses, a second step of deciding a transfer mode of the differential data to be transferred from the first storage apparatus to the second storage apparatus based on the collected resource information, and a third step of controlling the first and second storage apparatuses so as to transfer the differential data from the first storage apparatus to the second storage apparatus according to the decided transfer mode.

According to the present invention, it is possible to perform the operation of remote copy according to the user's usage status, and improve the operation efficiency of a plurality of secondary sites.

DESCRIPTION OF DRAWINGS

FIG. 3 is a conceptual diagram explaining the pair information management table;

FIG. 4 is a conceptual diagram explaining the copy management table;

FIG. 5A is a conceptual diagram explaining the first resource management table;

FIG. 5B is a conceptual diagram explaining the second resource management table;

FIG. 5C is a conceptual diagram explaining the third resource management table;

FIG. 6 is a conceptual diagram explaining the remote processing resource table;

FIG. 7 is a chart showing an example of the resource usage information to be collected by the monitoring program;

FIG. 8 is a chart explaining the tendency of the user access frequency for each operational purpose of the secondary site;

FIG. 18 is a conceptual diagram showing an example of the switching condition definition information;

FIG. 19 is a conceptual diagram explaining the remote copy management table;

FIG. 20 is a conceptual diagram explaining the method of determining the size of the resource availability status;

FIG. 27 is a chart explaining the remote copy that is performed between the respective secondary sites upon switching the copy mode from the snapshot generation unit distribution mode to the fragment data distribution mode;

DETAILED DESCRIPTION

An embodiment of the present invention is now explained in detail with reference to the attached drawings.

(1) Configuration of Remote Copy System According to Present Embodiment

Figure 1:
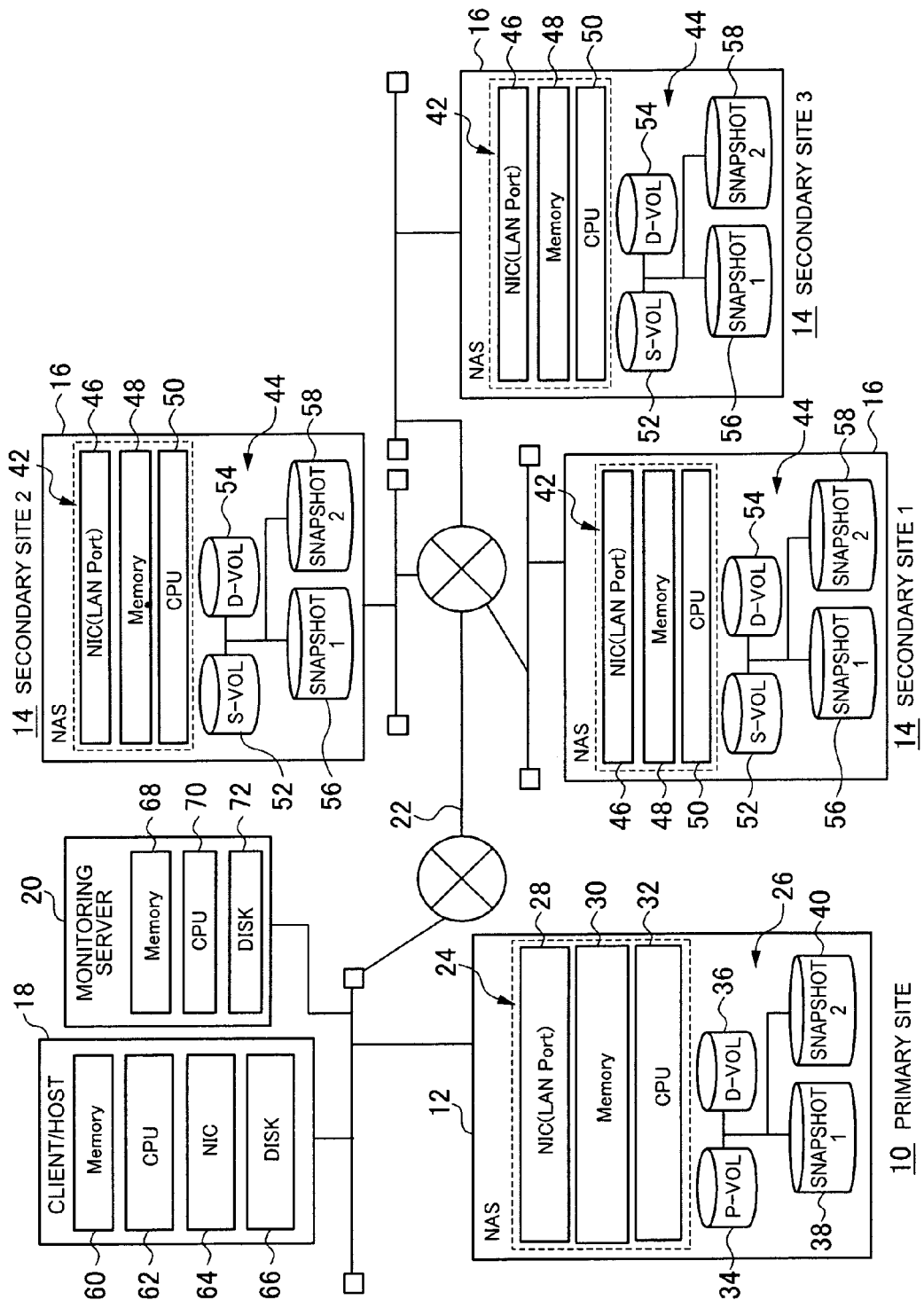
FIG. 1 is a block diagram showing the overall configuration of a remote copy system according to the first embodiment.

FIG. 1 shows the overall configuration of the remote copy system according to the present embodiment. With the remote copy system according to this embodiment, a NAS apparatus (this is hereinafter referred to as the "primary NAS apparatus") 12 installed in a primary site 10, a plurality of NAS apparatuses (each of these NAS apparatuses is hereinafter referred to as the "secondary NAS apparatus") 16 installed respectively in first to third secondary sites 14, a host computer 18, and a monitoring server 20 are connected via a network 22.

The primary NAS apparatus 12 is a file server for providing a file sharing service to the host computer 18, and comprises a controller 24 and a memory device 26.

The controller 24 comprises an NIC (Network Interface Card) 28, a memory 30, and a CPU (Central Processing Unit) 32. The NIC 28 is an interface for connecting the controller 24 to the network 22, and the memory 30 is used for storing the OS (Operating System) and various programs as described later.

The CPU 32 is a processor that governs the operational control of the overall primary NAS apparatus 12, and performs control of inputting and outputting data to and from the memory device 26 and transferring remote copy-target data stored in the memory device 26 to the secondary site 14 during the remote copy according to the programs stored in the memory 30.

The memory device 26 is configured from a plurality of disk drives. The RAID (Redundant Array of Inexpensive Disks) group is configured from one or more disk drives, and one or more logical volumes are defined in the storage areas that are provided by the RAID group.

In the case of this embodiment, attributes of the logical volumes include a primary volume 34 that is used by the host computer 18 for reading and writing data, and a differential volume 36 for saving data immediately before it is updated as differential data when data stored in the primary volume 34 is to be updated. The snapshots 38, 40 are created based on the data stored in the primary volume 34 and the differential data stored in the differential volume 36.

The secondary NAS apparatus 16 is a file server that is used for retaining the replication of the data stored in the primary volume 34 of the primary NAS apparatus 12, and comprises a controller 42 and a memory device 44.

The controller 42 comprises an NIC 46, a memory 48, and a CPU 50. The NIC 46 is an interface for connecting the respective controllers 42 to the network 22, and the memory 48 is used for storing the OS and various programs as described later.

The CPU 50 is a processor that governs the operational control of the overall secondary NAS apparatus 16, and performs control of sending and receiving information to and from the other apparatuses via the network 22 and controlling the input and output of data to and from the memory device 44 according to the programs stored in the memory 48.

The memory device 44 is configured from a plurality of disk drives. The RAID group is configured from one or more disk drives, and one or more logical volumes are defined in the storage areas that are provided by the RAID group.

In the case of this embodiment, attributes of the logical volumes include a secondary volume 52 for restoring a data image of the primary volume 34 of the primary NAS apparatus 12, and a differential volume 54 for saving data immediately before it is updated as differential data when data stored in the secondary volume 52 is to be updated. The snapshots 56, 58 are created based on the data stored in the secondary volume 52 and the differential data stored in the differential volume 54.

The host computer 18 is a computer device that is used as a client terminal or a higher-level computer to be operated by the user, and comprises a memory 60, a CPU 62, an NIC 64, and a disk device 66. Although FIG. 1 shows only one host computer 18, a plurality of host computers 18 may be provided in certain cases.

The memory 60 is used for storing programs and the OS that are required for accessing the primary NAS apparatus 12 and the respective secondary NAS apparatuses 16. The CPU 62 is a processor that governs the operational control of the overall host computer 18, and executes various types of arithmetic processing according to the programs stored in the memory 60, and also performs control for accessing the primary NAS apparatus 12 and the respective secondary NAS apparatuses 16. The NIC 64 is an interface for connecting the host computer 18 to the network 22. The disk device 66 is used as a storage medium for storing user data and the like.

The monitoring server 20 is a server apparatus loaded with a function of monitoring the usage status of resources in the primary site 10 and the respective secondary sites 14 as described later, and controlling the data transfer mode (this is hereinafter referred to as the "copy mode") during the remote copy between the primary NAS apparatus 12 and the respective secondary NAS apparatuses 16 based on the monitoring result, and comprises a memory 68, a CPU 70, and a disk device 72.

The memory 68 is used for storing programs and the OS required for accessing the primary NAS apparatus 12 and the secondary NAS apparatus 16. As described later, the program for monitoring the usage status of resources in the primary NAS apparatus 12 and the respective secondary NAS apparatuses 16, and the program for controlling the copy mode of the remote copy between the primary NAS apparatus 12 and the respective secondary NAS apparatuses 16 are also stored in the memory 68.

The CPU 70 is a processor that governs the operational control of the overall monitoring server 20, and performs various types of arithmetic processing according to the programs stored in the memory 68, and also sends the respective processing results to the primary NAS apparatus 12 and/or the secondary NAS apparatus 16 via the network 22. The disk device 72 is used as a storage medium for storing data and the like concerning the processing result of the CPU 70.

The network 22 is configured from a LAN (Local Area Network), Internet, a public line or a dedicated line. The communication among the primary NAS apparatus 12, the secondary NAS apparatus 16, the host computer 18 and the monitoring server 20 is conducted according to a TCP/IP (Transmission Control Protocol/Internet Protocol) protocol when the network 22 is a LAN.

Figure 2:
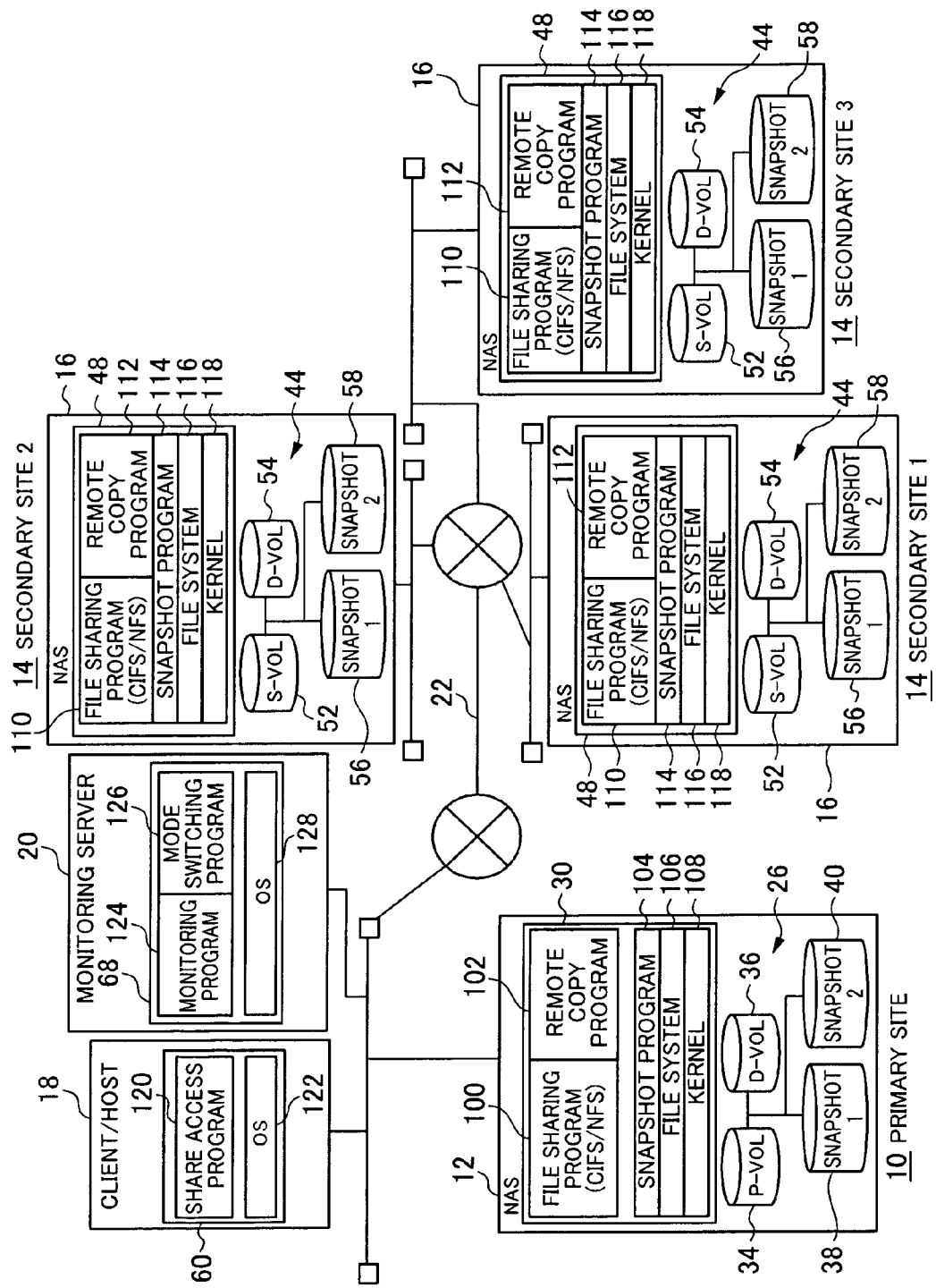
FIG. 2 is a block diagram explaining the software configuration of the remote copy system shown in FIG. 1.

FIG. 2 shows the software configuration of the remote copy system according to the present embodiment.

In the case of this remote copy system, the memory 30 of the primary NAS apparatus 12 stores a file sharing program 100, a remote copy program 102, a snapshot program 104, a file system 106 and a kernel 108, and the memory 48 of the respective secondary NAS apparatuses 16 stores a file sharing program 110, a remote copy program 112, a snapshot program 114, a file system 116 and a kernel 118.

The memory 60 of the host computer 18 stores a share access program 120 and an OS 122, and the memory 68 of the monitoring server 20 stores a monitoring program 124, a mode switching program 126, and an OS 128.

The file sharing programs 100, 110 are programs for providing a file sharing protocol such as a CIFS (Common Internet File System) and an NFS (Network File System) to the host computer 19 connected via the network 22, and providing a file sharing service of sharing one file among a plurality of host computers 18. The CPUs 32, 50 execute data I/O processing according to the data I/O request in file units provided from the host computer 18 by executing the file sharing programs 100, 110.

The remote copy programs 102, 112 are programs for transferring the differential data stored in the differential volume 36 to the secondary NAS apparatus 16 as remote copy-target data during the remote copy.

The snapshot program 104 is a program for acquiring the snapshot of a plurality of generations with the static data image at a certain point in time of the primary volume 34 as the snapshot. The snapshot program 114 is a program for acquiring the snapshot of a plurality of generations with the static data image at a certain point in time of the secondary volume 52 as the snapshot.

For example, the CPU 32 periodically or randomly creates a snapshot by executing the snapshot program 104. The CPU 32 saves data immediately before it is updated in the differential volume 36 each time data in the primary volume 34 is to be updated, writes new data in the primary volume 34, and stores information (this is hereinafter referred to as the "snapshot management information") concerning the update location of the data and the save destination of the pre-update data in the memory 60.

The CPU 32 combines, as needed, data that was not updated at a certain point in time in the past among the data of the primary volume 34 and the pre-update data saved in the differential volume 36 at such point in time, and creates a snapshot of the primary volume 34 at that point in time. Consequently, the CPU 32 is able to manage the snapshot at a certain point in time in the past across a plurality of generations.

The file systems 106, 116 logical structures that are created for realizing a management unit referred to as a "file" in the physical volume, and are programs for providing a logical view of directories or files that are configured in a hierarchy to the host computer 18, converting the logical view into a physical data structure such as a block data or a block address, and executing the data I/O processing between the controllers 24, 42 and the memory devices 26, 44.

The kernels 108, 118 are operating systems for controlling the corresponding primary NAS apparatus 12 or the secondary NAS apparatus 16.

The share access program 120 is a program configured to enable access to the file systems 106, 116 that are presented by the file sharing programs 100, 110 on the corresponding primary NAS apparatus 12 or the secondary NAS apparatus 16.

The monitoring program 124 is a program for monitoring, as the usage status of resources, the usage status of the CPUs 32, 50 and the memories 30, 48 of the primary NAS apparatus 12 and the secondary NAS apparatus 16, the disk I/O amount in the memory devices 26, 44, and the network usage between the primary site 10 and the respective secondary sites 14, and collecting the monitoring result as resource usage information.

The mode switching program 126 is a program for switching the remote copy mode between the primary site 10 and the respective secondary sites 14 as needed according to the resource usage information that was collected according to the monitoring program 124.

(2) Remote Copy Control Function According to Present Embodiment (2-1) Outline and Configuration of Respective Tables The remote copy control function of this embodiment that is loaded in the monitoring server 20 of the remote copy system is now explained.

With this remote copy system, remote copy is performed between the primary NAS apparatus 12 and the respective secondary NAS apparatuses 16; that is, the snapshot data of the primary volume 34 (more precisely, the differential data stored in the differential volume 36) that is created periodically in the primary NAS apparatus 12 is remote-copied to the respective secondary NAS apparatuses 16 (remote copy function). The secondary NAS apparatus 16 thereby restores the static data image of the primary volume 34 at the point in time that the snapshot was created to the secondary volume 52 based on the snapshot data obtained from the foregoing remote copy.

Here, the monitoring server 20 collects resource usage information from the primary NAS apparatus 12 and the respective secondary NAS apparatuses 16, determines the operational purpose of the respective secondary sites 14 during the remote copy based on the collected resource usage information, and controls the primary NAS apparatus 12 and the respective secondary NAS apparatuses 16 so as to operate the respective secondary sites 14 as the backup site or the mirror site of the primary site 10 according to the foregoing determination result (remote copy control function).

As means for exhibiting the foregoing remote copy function and the remote copy control function, the memories 30, 48 of the primary NAS apparatus 12 and the respective secondary NAS apparatuses 16 respectively store a pair information management table T1 as shown in FIG. 3, and a copy management table T2 as shown in FIG. 4. The memory 68 of the monitoring server 20 stores the foregoing pair information management table T1 and copy management table T2, as well as the first to third resource management tables T3A to T3C as shown in FIG. 5A to FIG. 5C, and a remote copy processing resource table T4 as shown in FIG. 6.

Among the above, the pair information management table T1 is a table for managing the copy pair during the remote copy and is configured, as shown in FIG. 3, from a pair name field 200, a site type field 202, a site information field 204, and a retained snapshot field 206.

The pair name field 200 stores the pair name of the corresponding copy pair, and the site type field 202 stores the site name of the respective sites (primary site 10 and respective secondary sites 14) to which the respective NAS apparatuses (primary NAS apparatus 12 and secondary NAS apparatus 16) configuring that copy pair are installed.

The site information field 204 is configured from a host name field 208, a port number field 210, and a file system name field 212. The host name field 208 stores the identifying information of the NAS apparatus (primary NAS apparatus 12 or secondary NAS apparatus 16) installed in the corresponding site, and the port number field 210 stores the port number upon accessing that NAS apparatus. The file system name field 212 stores the file system name of the file system that is loaded in that NAS apparatus.

The retained snapshot field 206 stores the identifying information of all snapshots that are retained in the NAS apparatus installed in the corresponding site.

The copy management table T2 is a table for managing the copy status of the respective copy pairs and is configured, as shown in FIG. 4, from a pair name field 220, a site type field 222, a copy source information field 224, a copy mode field 226, a copy status field 228, a baseline field 230, a copying field 232, and a copy-target snapshot field 234.

The pair name field 220 stores the pair name of the corresponding copy pair, and the site type field 222 stores the site name of the respective secondary sites 14 in which the respective secondary NAS apparatuses 16 configuring that copy pair are installed.

The copy source information field 224 stores the identifying information of the copy source NAS apparatus (primary NAS apparatus 12) of the remote copy that is currently being executed in that copy pair, and the copy mode field 226 stores the code that is assigned to the copy mode of the remote copy to be performed between the copy source NAS apparatus and the secondary NAS apparatus 16 that is installed in the corresponding secondary site 14.

The copy status field 228 stores the current status of the remote copy that is being performed between the copy source NAS apparatus and the secondary NAS apparatus 16 that is installed in the corresponding secondary site 14, and the baseline field 230 stores the snapshot name of the snapshot (baseline snapshot) to become the basis for the differential copy in that remote copy.

The copying field 232 stores the snapshot name of the snapshot that is subject to the remote copy that is currently being executed between the copy source NAS apparatus and the secondary NAS apparatus 16 that is installed in the corresponding secondary site 14, and the copy-target snapshot field 234 stores the snapshot name of all snapshots to become the copy target of the remote copy that is being executed at that time.

Meanwhile, the first to third resource management tables T3A to T3C are tables for managing the resource status of the respective NAS apparatuses (primary NAS apparatus 12 and secondary NAS apparatus 16) that are defined as a copy pair and is configured, as shown in FIG. 5A to FIG. 5C, from a pair name field 240, a site type field 242, a site status field 244, and a site spec field 246.

The pair name field 240 stores the pair name of the corresponding copy pair, and the site type field 242 stores the site name of the site (primary site 10 or secondary site 14) in which the respective NAS apparatuses configuring that copy pair are installed.

The site status field 244 stores the status representing the availability of the NAS apparatus (primary NAS apparatus 12 or secondary NAS apparatus 16) installed in the corresponding site. For example, if the NAS apparatus that is installed in the corresponding site is available, then "Available" is stored, and if it is unavailable, then "Down" is stored.

The site spec field 246 is configured from a CPU utilization field 248, a memory field 250, a disk write field 252, and a disk read field 254.

The CPU utilization field 248 stores the current utilization of the CPUs 32, 50 (FIG. 1) of the NAS apparatus installed in the corresponding site, and the memory field 250 stores the current usage of the memories 30, 48 (FIG. 1) loaded in that NAS apparatus, and the predetermined upper limit thereof.

The disk write field 252 stores the current write amount of data per second into the memory devices 26, 44 loaded in the NAS apparatus installed in the corresponding site, and the predetermined upper limit thereof. Similarly, the disk read field 254 stores the current read amount of data from the memory devices 26, 44 loaded in the NAS apparatus installed in the corresponding site, and the predetermined upper limit thereof.

Meanwhile, the second resource management table T3B is configured from a pair name field 260, a site type field 262, and an inter-site network band field 264.

The pair name field 260 and the site type field 262 respectively store the same information as the pair name field 240 and the site type field 242 of the first resource management table T3A.

The inter-site network band field 264 is configured from a primary site field 266, and a plurality of secondary site fields 268.

The primary site field 266 stores the current band usage of the network 22 connecting the NAS apparatus 12 installed in the primary site 10 and the NAS apparatus 16 installed in the corresponding secondary site 14, and the predetermined upper limit thereof.

The secondary site field 268 stores the current band usage of the network 22 connecting the NAS apparatus 12 installed in the respective secondary sites 14 and the NAS apparatus 16 installed in the corresponding secondary site 14, and the predetermined upper limit thereof.

Meanwhile, the third resource management table T3C is configured from a pair name field 270, a site type field 272, an accessible user count field 274, a user access frequency field 276, a file type field 278, and an identical extension file occupancy ratio field 280.

The pair name field 270 and the site type field 272 respectively store the same information as the pair name field 240 and the site type field 242 of the first resource management table T3A.

The accessible user count field 274 stores the number of users permitted to access the NAS apparatus 12 installed in the primary site 10, and the secondary NAS apparatus 16 installed in the respective secondary sites 14, and the user access frequency field 276 stores the total number of accesses from the user to the NAS apparatus installed in the corresponding site during a given period of time.

The file type field 278 stores the file format with the largest occupancy ratio among the file formats that are stored in the NAS apparatus installed in the corresponding site, and the identical extension file occupancy ratio field 280 stores the ratio of files in such file format in relation to the total number of files stored in that NAS apparatus.

The remote copy processing resource table T4 is a table for managing the usage of resources that are required for executing one remote copy processing and is configured, as shown in FIG. 6, from a CPU utilization field 290, a memory field 292, a disk write field 294, a disk read field 296, and a network band field 298.

The CPU utilization field 290 stores the utilization of the CPUs 32, 50 (FIG. 1) of the NAS apparatus (primary NAS apparatus 12 or secondary NAS apparatus 16) installed in the corresponding site (primary site 10 or secondary site 14) in a case of executing one remote copy. The memory field 292 stores the used capacity of the memories 30, 48 (FIG. 1) of that NAS apparatus to be used in a case of executing one remote copy.

The disk write field 294 stores the data write speed per second to the disk device of that NAS apparatus in a case of executing one remote copy, and the disk read field 296 stores the data read speed per second from that disk device in a case of executing one remote copy. The network band field 298 stores the usage of the network band in a case of executing one remote copy.

(2-2) Processing of Monitoring Server Concerning Remote Copy Control Function

The processing contents of the various types of processing to be executed by the monitoring server 20 in relation to the foregoing remote copy control function are now explained.

(2-2-1) Resource Usage Information Collection Processing

The monitoring server 20 periodically collects resource usage information in the primary NAS apparatus 12 and the respective secondary NAS apparatuses 16 from the NAS apparatus 12 installed in the primary site 10 and the NAS apparatus 16 installed in the respective secondary sites 14 according to the monitoring program 124.

Here, as the resource usage information to be collected by the monitoring program 124, as shown in FIG. 7, there are the following items; namely, CPU utilization, memory usage, disk I/O amount, network band usage, accessible user count, user access frequency, main file extension, and identical extension file occupancy ratio.

The CPU utilization is a value showing the utilization of the CPUs 32, 50 in the primary NAS apparatus 12 or secondary NAS apparatus 16, and takes on a value between "0%" and "100%." The greater the CPU utilization, this represents that there are numerous user accesses. The memory usage represents the memory capacity which is being consumed by the process that is running on the primary NAS apparatus 12 or the secondary NAS apparatus 16. The greater the memory capacity, this represents that there are numerous user accesses.

The disk I/O amount represents the total I/O amount generated by the process that is running on the primary NAS apparatus 12 or the secondary NAS apparatus 16. The greater the value, this represent that there are numerous user accesses to the primary NAS apparatus 12 or the secondary NAS apparatus 16. If the I/O wait time is long, this represents that the processable I/O has peaked (reached its limit).

The network band usage represents the data amount that was sent or received per second to or from the primary NAS apparatus 12 or secondary NAS apparatus 16 from or to a separate NAS apparatus (secondary NAS apparatus 16 or primary NAS apparatus 12). The accessible user count represents the number of users permitted to access the primary NAS apparatus 12 or the secondary NAS apparatus 16, and the user access frequency represents the total number of user accesses to the primary NAS apparatus 12 or the secondary NAS apparatus 16 during a given period of time.

The main file extension represents the most common file format (extension) among the file formats of the respective files that are being managed by the file system loaded in the primary NAS apparatus 12 or the secondary NAS apparatus 16. Since this information is the same in either the primary NAS apparatus 12 or the secondary NAS apparatus 16, such information is acquired only from the primary NAS apparatus 12. The identical extension file occupancy ratio represents the ratio of the files of the foregoing "main file extension" in relation to all files that are being managed in the file system.

The monitoring server 20 manages the resource usage information collected from the primary NAS apparatus 12 or the secondary NAS apparatus 16 by storing it in the corresponding field of the first and third resource management tables T3B, T3C (FIG. 5B, FIG. 5C).

Upon collecting the resource usage information as described above, the monitoring server 20 also collects the snapshot information that is being retained by the primary NAS apparatus 12 and the respective secondary NAS apparatuses 16, and stores the collected snapshot information in the pair information management table T1 (FIG. 3).

(2-2-2) Operational Purpose Determination Processing

Meanwhile, the monitoring server 20 determines the operational purpose of the respective secondary sites 14 during the remote copy based on the resource usage information that was collected from the primary NAS apparatus 12 and the respective secondary NAS apparatuses 16 as described above.

Here, as the operational purpose of the respective secondary sites 14, two purposes may be considered; namely, a backup site purpose of being used as the backup site of the primary site 10, and a mirror site purpose of being used as a mirror site of the primary site 10. The tendency of the user's access frequency in each operational purpose is shown in FIG. 8.

As shown in FIG. 8, if the operational purpose of the secondary site 14 is a backup site, access to the secondary NAS apparatus 16 is for confirming the backup data and the like, and the files stored in that secondary NAS apparatus 16 will hardly be accessed. Meanwhile, if the operational purpose of the secondary site 14 is a mirror site, the files stored in the secondary NAS apparatus 16 will be frequently accessed.

Moreover, if the operational purpose of the secondary site 14 is a backup site, the number of users permitted to access the secondary NAS apparatus 16 will be few, and the purpose of most of the users who will make access will be to restore the primary NAS apparatus 12. Meanwhile, if the operational purpose of the secondary site 14 is a mirror site, the number of users permitted to access the secondary NAS apparatus 16 will be great, or there will be frequent access from a specific host computer 18 (FIG. 1).

Furthermore, if the operational purpose of the secondary site 14 is a backup site, as the type of data retained in the primary NAS apparatus 12 and the secondary NAS apparatus 16, there will be many archive data and compressed files in which the extension is "tar," "zip" or "lzh." Meanwhile, if the operational purpose of the secondary site 14 is a mirror site, as the type of data stored in the secondary NAS apparatus 16, there will be many HTML (Hyper Text Markup Language) files, image files, and movie files in which the extension is "mpeg," "jpeg," "mp3" or "pdf."

In addition, if the operational purpose of the secondary site 14 is a backup site, the number of users to access the primary NAS apparatus 12 will be greater than the number of users to access the secondary NAS apparatus 16, and the primary NAS apparatus 12 will have a greater load than the secondary NAS apparatus 16. Meanwhile, if the operational purpose of the secondary site 14 is a mirror site, the number of users to access the primary NAS apparatus 12 will be limited. Thus, the number of users to access the primary NAS apparatus 12 will be less than the number of users to access the secondary NAS apparatus 16, and the secondary NAS apparatus 16 will have a greater load than the primary NAS apparatus 12.

Thus, in the case of the present remote copy system, the monitoring server 20 determines the operational purpose of the secondary site 14 based on the resource usage information collected from the primary NAS apparatus 12 and the respective secondary NAS apparatuses 16 in the foregoing resource usage information collection processing, and the tendency of access frequency described above with reference to FIG. 8, and controls the primary NAS apparatus 12 and the respective secondary NAS apparatuses 16 so as to execute the remote copy in a copy mode according to the determination result.

Specifically, if the monitoring server 20 determines that the operational purpose of the respective secondary sites 14 is a backup site, it selects the fragment data distribution mode as the copy mode of the remote copy between the primary NAS apparatus 12 and the respective secondary NAS apparatuses 16. Specifically, in consideration that the primary NAS apparatus 12 will be burdened with the load if the remote copy is performed under circumstances where most of the user access will be to the primary NAS apparatus 12 and the resources of the primary NAS apparatus 12 is constantly consumed by the users, the monitoring server 20 controls the primary NAS apparatus 12 and the respective secondary NAS apparatuses 16 so that the remote copy will be performed based on the fragment data distribution mode.

Figure 9:
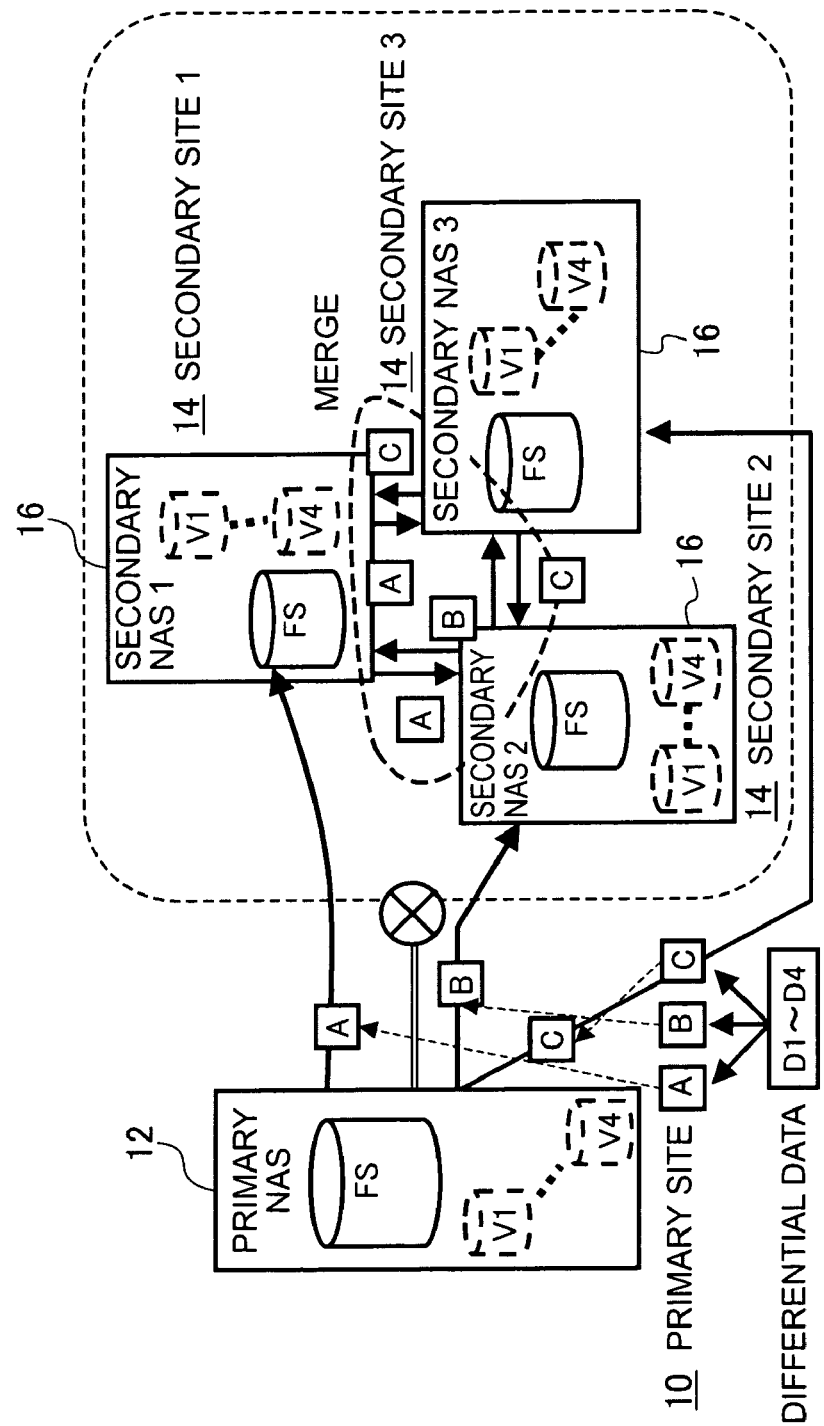
FIG. 9 is a conceptual diagram explaining the remote copy method according to the fragment data distribution mode.

The fragment data distribution mode is a mode where, as shown in FIG. 9, the differential data D1 to D4 corresponding to the snapshot of the respective generations in the primary NAS apparatus 12 is partitioned into the same quantity as the number of the destination secondary sites 14 (three in this example), and, with each of the partitioned differential data A to C obtained from the foregoing partition as fragment data, such fragment data is distributed and transferred to the respective secondary NAS apparatuses 16. FIG. 9 shows an example where the partitioned differential data A is transferred to the secondary NAS apparatus 16 referred to as the "NAS 1" installed in the first secondary site 14, the partitioned differential data B is transferred to the secondary NAS apparatus 16 referred to as the "NAS 2" installed in the second secondary site 14, and the partitioned differential data C is transferred to the secondary NAS apparatus 16 referred to as the "NAS 3" installed in the third secondary site 14.

On the side of the secondary sites 14, the respective secondary NAS apparatuses 16 thereafter mutually exchange the partitioned differential data A to C which it does not retain with the other secondary NAS apparatuses 16, and reproduces the differential data D1 to D4 by merging all partitioned differential data A to C that were obtained in the foregoing exchange.

According to the foregoing fragment data distribution mode, regardless of the number of secondary sites 14, there is an advantage in that the amount of partitioned differential data A to C to be transferred from the primary NAS apparatus 12 will be constant (i.e., will not change). In addition, if the time required for transferring all differential data D1 to D4 to one secondary NAS apparatus 16 is N, the transfer time will be N/M as a result of distributing and transferring the partitioned differential data A to C to M-number of secondary NAS apparatuses 16, whereby the transfer time can be shortened.

Here, with the fragment data distribution mode, even if the transfer of the partitioned differential data A to C from the primary NAS apparatus 12 to the secondary NAS apparatus 16 is complete, since each partitioned differential data A to C is distributed and stored in a plurality of secondary NAS apparatuses 16, the processing of merging the partitioned differential data A to C is required as described above, and there is a problem in that much time is required in order to completely reproduce the differential data V1 to V4 in the respective secondary NAS apparatuses 16.

Nevertheless, when adopting the fragment data distribution mode as the copy mode of the remote copy between the primary NAS apparatus 12 and the respective secondary NAS apparatuses 16, since the operational purpose of the secondary site 14 is assumed to be a backup site, the user's access frequency to the secondary NAS apparatus 16 will be low, and the influence on the users who will access the secondary NAS apparatuses 16 is considered to be low.

Incidentally, as the method of partitioning the differential data D1 to D4 in the primary NAS apparatus 12, the method of evenly portioning the differential data, or the method of proportionately partitioning the differential data according to the network band between the primary NAS apparatus 12 and the respective secondary NAS apparatuses 16 may be adopted.

Meanwhile, if the monitoring server 20 determines that the operation purpose of the respective secondary sites 14 is a mirror site, it selects the snapshot generation unit distribution mode as the copy mode of the remote copy between the primary NAS apparatus 12 and the secondary NAS apparatus 16. Specifically, in consideration of avoiding unnecessary resource consumption in the secondary NAS apparatus 16 due to the remote copy under circumstances where the user's access is concentrating on the secondary NAS apparatus 16, the monitoring server 20 controls the primary NAS apparatus 12 and the respective secondary NAS apparatuses 16 so that the remote copy between the primary NAS apparatus 12 and the secondary NAS apparatus 16 is conducted based on the snapshot generation unit distribution mode.

Figure 10:
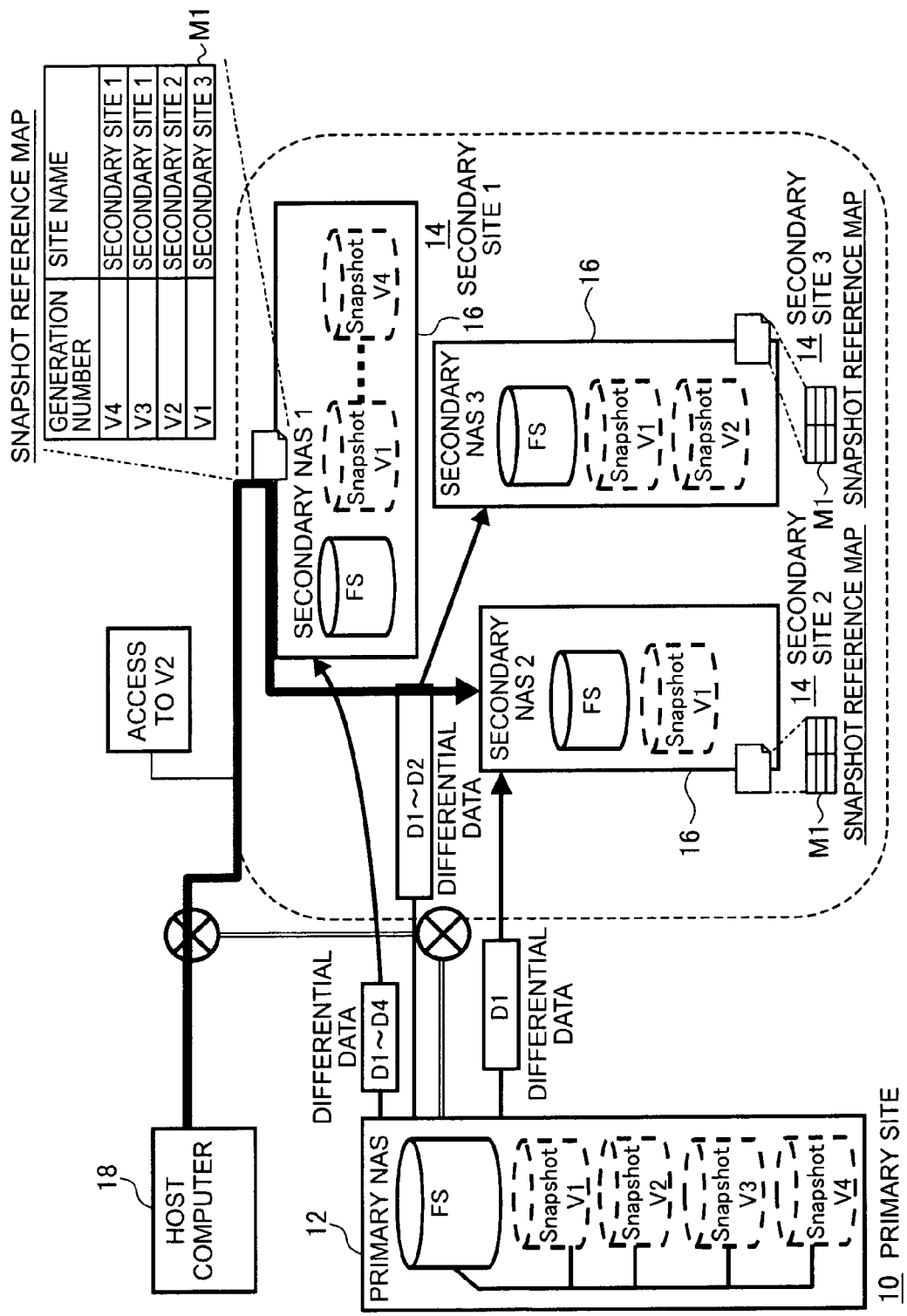
FIG. 10 is a conceptual diagram explaining the remote copy method according to the snapshot generation unit distribution mode.

The snapshot generation unit distribution mode is a mode where, as shown in FIG. 10, the differential data D1 to D4 concerning the snapshot of the respective generations (first to fourth generations in FIG. 10) that are created in the primary NAS apparatus 12 is transferred to each secondary NAS apparatus 16 upon decimating data in snapshot units according to the number of users using that secondary NAS apparatus 16. FIG. 10 shows an example where all differential data D1 to D4 concerning the snapshot of the first to fourth generations is transferred to the secondary NAS apparatus 16 referred to as the "NAS 1" installed in the first secondary site 14, only the differential data D1 concerning the snapshot of the first generation is transferred to the secondary NAS apparatus 16 referred to as the "NAS 2" installed in the second secondary site 14, and only the differential data D1, D2 concerning the snapshot of the first and second generations are transferred to the secondary NAS apparatus 16 referred to as the "NAS 3" installed in the third secondary site 14.

According to this snapshot generation unit distribution mode, there is an advantage in that the secondary NAS apparatus 16 which received the differential data D1 to D4 from the primary NAS apparatus 12 is able to instantaneously create the snapshot of the corresponding generation. Moreover, according to the snapshot generation unit distribution mode, since the differential data D1 to D4 to be transferred are sorted and decimated in snapshot units, the transfer data amount can be reduced. Here, as a result of increasing the number of snapshots to be decimated in proportion to fewer resources, the transfer data amount can be reduced even further.

Moreover, according to the snapshot generation unit distribution mode, there is also an advantage in that, since the primary NAS apparatus 12 will burden the processing of sorting the differential data D1 to D4 to be transferred, the load of the secondary NAS apparatus 16 to be accessed by the user using the host computer 18 can be reduced.

Nevertheless, according to the snapshot generation unit distribution mode, since there will be variation in the snapshots that can be referred to among the secondary NAS apparatuses 16, there is problem in that, depending on the secondary NAS apparatus 16 that is accessed by the host computer 18, it may not be possible to refer to the snapshot of the intended generation.

Thus, in the present embodiment, the respective secondary NAS apparatuses 16 create a table (this is hereinafter referred to as the "snapshot reference map") M1 as shown in FIG. 10 mapping which secondary NAS apparatus 16 should be accessed for referring to the snapshot of the respective generations, and the user is able to refer to the intended snapshot by accessing the corresponding secondary NAS apparatus 16 based on the foregoing snapshot reference map M1.

The snapshot reference map M1 is of a mapping configuration where the access destination of the snapshot of the respective generations is distributed to all secondary sites 14. Thus, upon transferring the necessary differential data D1 to D4 from the primary NAS apparatus 12 to the respective secondary NAS apparatuses 16, in the least, it is necessary to select the snapshot (differential data D1 to D4) to be transferred to the respective secondary NAS apparatuses 16 so as to satisfy the conditions of the snapshot reference map M1. Thus, the number of snapshots to be transferred to the respective secondary NAS apparatuses 16 should be decided according to the available resource amount while satisfying the foregoing conditions.

The snapshot reference map M1 is stored in the memory 48 (FIG. 1) of the respective secondary NAS apparatuses 16. When the user is to refer to the snapshot reference map M1, the user will make an inquiry to the secondary NAS apparatus 16 that he/she previous accessed. Thus, if the secondary NAS apparatus 16 of the referral destination of the intended snapshot has been switched to another secondary NAS apparatus 16, processing for changing the access destination is required.

The routine of creating the foregoing snapshot reference map M1 is now explained.

Figure 11:
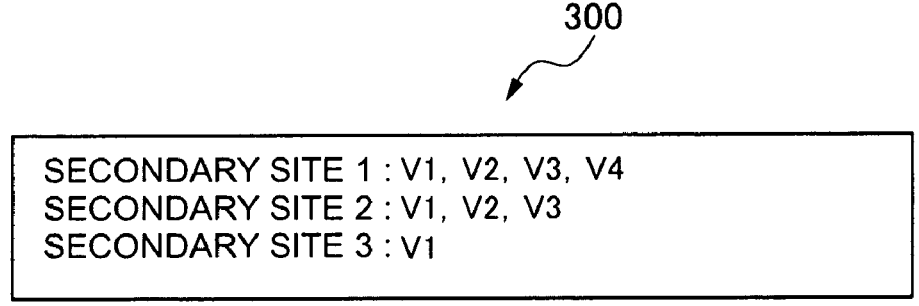
FIG. 11 is a conceptual diagram showing an example of the snapshot list.

Foremost, the secondary NAS apparatuses 16 periodically exchange the snapshot generation information that it retains with each other and creates, for example, a snapshot list 300 as shown in FIG. 11. The snapshot list 300 is a table for managing the generations of the snapshots retained in the respective secondary NAS apparatuses 16.

In FIG. 11, the secondary NAS apparatus 16 installed in the secondary site 14 referred to as the "secondary site 1" retains the differential data D1 to D4 concerning the snapshot of the first to fourth generations, the secondary NAS apparatus 16 installed in the secondary site 14 referred to as the "secondary site 2" retains the differential data D1, D2 concerning the snapshot of the first and second generations, and the secondary NAS apparatus 16 installed in the secondary site 14 referred to as the "secondary site 3" retains the differential data D1 concerning the snapshot of the first generation.

Subsequently, based on the created snapshot list 300, the respective secondary NAS apparatuses 16 recognize the generations of the snapshots retained in the respective secondary NAS apparatuses 16 and the generations of the snapshots that are not retained in the respective secondary sites, and, based on the recognition result, creates the snapshot reference map M1 according to the following rules (A) and (B).

Rules:
(A) Only the snapshot of the generation that is not retained in the self-NAS apparatus 16 is presented to the other secondary NAS apparatuses 16. However, if there is a snapshot of a generation that is only retained in the self-NAS apparatus 16 for all practical purposes due to the non-disclosure of the other secondary NAS apparatuses 16, the snapshot of such generation will also be presented.

(B) If there is no snapshot of the generated that is not owned only by the self-NAS apparatus 16, the snapshots of all retained generations will be presented.

Specifically, the respective secondary NAS apparatuses 16 search for a secondary NAS apparatus 16 retaining a snapshot of a generation that is not retained in the other secondary NAS apparatuses 16 from the snapshot list 300, and registers the generation of that snapshot and the site name of the secondary site in which that secondary NAS apparatus 16 exists in the snapshot reference map M1. For example, in the case of the example illustrated in FIG. 11, since the snapshot of the fourth generation is only retained in the secondary NAS apparatus 16 installed in the secondary site 14 referred to as the "secondary site 1," as shown in FIG. 12, information of "V4" as the generation number and "secondary site 1" as the site name is registered in the snapshot reference map M1 of the respective secondary NAS apparatuses 16.

Subsequently, the respective secondary NAS apparatuses 16 deletes the entry of the secondary site 14 that was registered in the snapshot reference map M1 as described above from the snapshot list 300. For example, in the case of the example illustrated in FIG. 11, as shown in FIG. 13, the secondary site 14 referred to as the "secondary site 1" is deleted from the snapshot list 300.

Subsequently, the respective secondary NAS apparatuses 16 once again searches for a secondary NAS apparatus 16 retaining a snapshot of a generation that is not retained in the other secondary NAS apparatuses 16 from the snapshot list 300, and additionally registers the generation of that snapshot and the site name of the secondary site 14 in which that secondary NAS apparatus 16 exists to the snapshot reference map M1 shown in FIG. 12.

Figure 12:
FIG. 12 is a conceptual diagram explaining the creation processing of a snapshot reference map.
Figure 13:
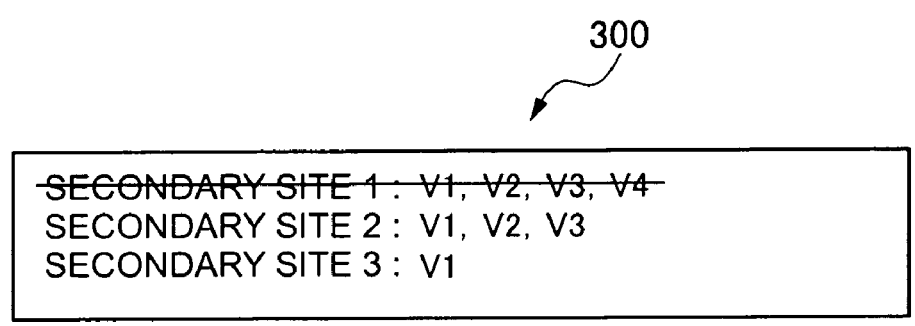
FIG. 13 is a conceptual diagram explaining the creation processing of a snapshot reference map.
Figure 14:
FIG. 14 is a conceptual diagram explaining the creation processing of a snapshot reference map.

For example, in the case of FIG. 13, since the snapshot of the second and third generations is only retained in the secondary NAS apparatus 16 installed in the secondary site 14 referred to as the "secondary site 2" in the snapshot list 300 that is retained in the respective secondary NAS apparatuses 16, as shown in FIG. 14, the entry where the generation number is "V3" and the site name is "secondary site 2" and the entry where the generation number is "V3" and the site name is "secondary site 2" are added to the snapshot reference map M1 of FIG. 12 in the respective secondary NAS apparatuses 16.

Figure 15:
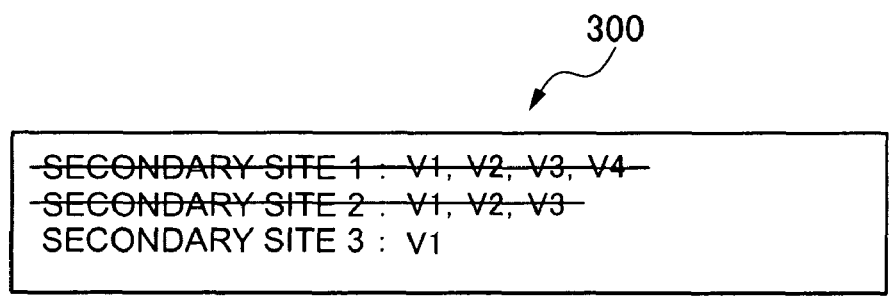
FIG. 15 is a conceptual diagram explaining the creation processing of a snapshot reference map.

The respective NAS apparatuses 16 thereafter deletes the entry of the secondary site 14 registered in the snapshot reference map M1 as described above from the snapshot list 300. For instance, in the case of the example illustrated in FIG. 13, as shown in FIG. 15, the entry of the secondary site 14 referred to as the "secondary site 2" is deleted from the snapshot list 300.

Figure 16:
FIG. 16 is a conceptual diagram explaining the creation processing of a snapshot reference map.
Figure 17:
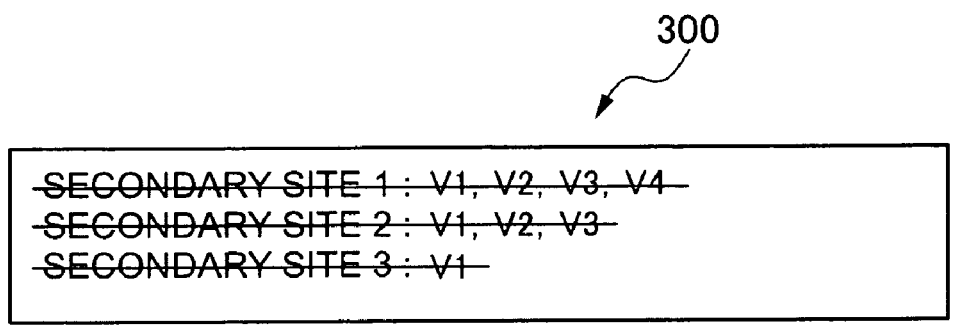
FIG. 17 is a conceptual diagram explaining the creation processing of a snapshot reference map.

The respective secondary NAS apparatuses 16 thereafter repeat the same processing until all entries are deleted from the snapshot list 300. For instance, in the case of the example illustrated in FIG. 15, since the snapshot of the first generation is only retained in the secondary NAS apparatus 16 installed in the secondary site 13 referred to as the "secondary site 3" in the snapshot list 300 that is retained in the respective secondary NAS apparatuses 16 at such time, as shown in FIG. 16, the entry where the generation number is "V1" and the site name is "secondary site 3" will be registered in the snapshot reference map M1 of the respective secondary NAS apparatuses 16. In addition, as shown in FIG. 17, the respective secondary NAS apparatuses 16 delete the entry of the secondary site 14 referred to as the "secondary site 3" from the snapshot list 300.

When all entries are deleted from the snapshot list 300, the respective NAS apparatuses 16 end this processing.

When the respective secondary NAS apparatuses 16 finish creating the snapshot reference map M1 according to the processing described above, and thereafter receives a referral request to a snapshot from the host computer 18, it seeks the secondary NAS apparatus 16 of the referral destination according to the snapshot reference map M1, and commands the host computer 18 to acquire the differential data D1 to D4 from the secondary NAS apparatus 16 that are required for the user to referred to the snapshot subject to the referral request. Incidentally, the secondary NAS apparatus 16 that received the referral request to the snapshot from the host computer 18 may also acquire the differential data D1 to D4 from the relevant secondary NAS apparatus 16 and provide such differential data D1 to D4 to the host computer 18.

Meanwhile, the operational purpose of the secondary site 14 may change depending on the time or time period, and the operational purpose of the secondary site 14 is not necessarily always constant. Thus, in this embodiment, as a result of setting definition information (this is hereinafter referred to as the "switching condition definition information") as the condition for switching the copy mode of the remote copy to the monitoring server 20 in advance, the copy mode of the remote copy is switched to another copy mode as needed according to the foregoing switching condition definition information.

An example of such switching condition definition information is shown in FIG. 18. In the case of the example illustrated in FIG. 18, the number of users permitted to access the primary NAS apparatus 12 installed in the primary site 10 is greater than the total value of the number of users permitted to access the secondary NAS apparatus 16 installed in the secondary site 14, and the ratio of files having the extension of "tar," "zip" or "lzh" in relation to all files stored in the primary NAS apparatus 12 is greater than 50%, it is defined that the copy mode of the remote copy between the primary NAS apparatus 12 and the respective secondary NAS apparatuses 16 is to be switched to the copy mode (fragment data distribution mode in this embodiment) in the case where the operational purpose of the secondary site 14 is a backup site.

Moreover, in the case of FIG. 18, if the number of users permitted to access the primary NAS apparatus 12 is less than the total value of the number of users permitted to access the secondary NAS apparatus 16, and the ratio of files in which the extension is "mpeg," "jpeg," "mp3" or "pdf" in relation to all files stored in the primary NAS apparatus 12 is greater than 50%, it is defined that the copy mode of the remote copy between the primary NAS apparatus 12 and the respective secondary NAS apparatuses 16 is to be switched to the copy mode (snapshot generation unit distribution mode in this embodiment) in the case where the operational purpose of the secondary site 14 is a mirror site.

Incidentally, in the example of FIG. 18, it is also defined that the default of the copy mode of the remote copy between the primary NAS apparatus 12 and the secondary NAS apparatus 16 is the copy mode in the case where the operational purpose of the secondary site 14 is a backup site.

(2-2-3) Remote Copy Execution Processing

Meanwhile, after deciding the copy mode that is appropriate for the operational purpose of the secondary site 14 as described above, the monitoring server 20 decides the remote copy configuration that will not affect the service being provided to the user, and controls the primary NAS apparatus 12 and the respective secondary NAS apparatuses 16 so as to executed the remote copy based on the decided remote copy configuration.

The decision of the foregoing remote copy configuration is made by deciding the differential data amount to be transferred based on the first to third resource management tables T3A to T3C explained above with reference to FIG. 5A to FIG. 5C, and the secondary site 14 (this is hereinafter referred to as the "representative secondary site") to which the foregoing partitioned differential data and differential data are to be directly transferred from the primary site 10 based on the current resource availability status (this is hereinafter referred to as the "resource availability status"). The representative secondary site transfers the differential data to the secondary sites 14 other than the representative secondary site.

As the means for deciding the representative secondary site, the monitoring server 20 defines a remote copy management table T5 as shown in FIG. 19 based on the differential data amount to be transferred and the current resource availability status.

The remote copy management table T5 is a table that defines the differential data amount to be remote-copied from the NAS apparatus 12 of the primary site 10 to the NAS apparatus 16 of the respective secondary sites 14, and the number of secondary sites 14 (these are hereinafter referred to as the "representative secondary sites") to which the differential data is to be directly transferred from the primary site 10 according to the current resource availability status.

For instance, in the case of the example illustrated in FIG. 19, it is defined that, when the differential data amount is 100 MB or greater, the number of representative secondary sites is "3" when the resource availability status is "large," the number of representative secondary sites is "2" when the resource availability status is "medium," and the number of representative secondary sites is "1" when the resource availability status is "small."

Moreover, in the case of the example illustrated in FIG. 19, it is defined that, when the differential data amount is 10 MB or greater and less than 100 MB, the number of representative secondary sites is "3" when the resource availability status is "large," the number of representative secondary sites is "2" when the resource availability status is "medium," and the number of representative secondary sites is "1" when the resource availability status is "small."

Furthermore, in the case of the example illustrated in FIG. 19, it is defined that, when the differential data amount is less than 10 MB, the number of representative secondary sites is "3" when the resource availability status is "large," the number of representative secondary sites is "3" when the resource availability status is "medium," and the number of representative secondary sites is "2" when the resource availability status is "small."

The method of determining the size of the resource availability status is now explained. In this embodiment, the size of the resource availability status is determined based on a value obtained by multiplying a certain ratio (0 to 100%) to the average value of the upper limits regarding the memory size, the disk I/O amount and the network band usage in the primary NAS apparatus 12 and the respective secondary NAS apparatuses 16, and the current average value of the foregoing values.

FIG. 20 shows an example of a method of determining the size of the resource availability status. In the case of this example, the monitoring server 20 determines that the resource availability status is "large" when the average value of the usage of the memory 48 (FIG. 1) in the respective secondary NAS apparatuses 16 is less than 20% of the average of the upper limit of the memory size of the memory 48 in the respective secondary NAS apparatuses 16, the average value of the disk I/O amount in the respective secondary NAS apparatuses 16 is less than 20% of the average value of the upper limit of the disk I/O amount in the respective secondary NAS apparatuses 16, and the average value of the network band usage in the respective secondary NAS apparatuses 16 is less than 20% of the average value of the upper limit of the network band usage in the respective secondary NAS apparatuses 16.

Moreover, in the case of this example, the monitoring server 20 determines that the resource availability status is "medium" when the average value of the usage of the memory 48 (FIG. 1) in the respective secondary NAS apparatuses 16 is greater than 50% of the average of the upper limit of the memory size of the memory 48 in the respective secondary NAS apparatuses 16, the average value of the disk I/O amount in the respective secondary NAS apparatuses 16 is greater than 50% of the average value of the upper limit of the disk I/O amount in the respective secondary NAS apparatuses 16, and the average value of the network band usage in the respective secondary NAS apparatuses 16 is greater than 50% of the average value of the upper limit of the network band usage in the respective secondary NAS apparatuses 16.

Furthermore, in the case of this example, the monitoring server 20 determines that the resource availability status is "small" when the average value of the usage of the memory 48 (FIG. 1) in the respective secondary NAS apparatuses 16 is greater than 70% of the average of the upper limit of the memory size of the memory 48 in the respective secondary NAS apparatuses 16, the average value of the disk I/O amount in the respective secondary NAS apparatuses 16 is greater than 70% of the average value of the upper limit of the disk I/O amount in the respective secondary NAS apparatuses 16, and the average value of the network band usage in the respective secondary NAS apparatuses 16 is greater than 70% of the average value of the upper limit of the network band usage in the respective secondary NAS apparatuses 16.

If the current resource availability status does not correspond to any of the foregoing conditions, the monitoring server 20 determines the resource availability status to be "medium."

When the monitoring server 20 decides the differential data amount to be remote-copied from the NAS apparatus 12 of the primary site 10 to the NAS apparatus 16 of the respective secondary sites 14 based on the remote copy management table T5, and the number of representative secondary sites according to the current resource availability status, it selects the representative secondary sites (secondary sites 14) in a quantity of such number of representative secondary sites.

As a method of selecting the representative secondary sites in a quantity of the decided number of representative secondary sites among the plurality of secondary sites 14, a method of selecting the representative secondary sites in the order that they were registered in the pair information management table T1 (FIG. 3), or a method of selecting the secondary sites 14 in order from those having the smallest load by referring to the first to third resource management tables T3A to T3C may be adopted.

Figure 21:
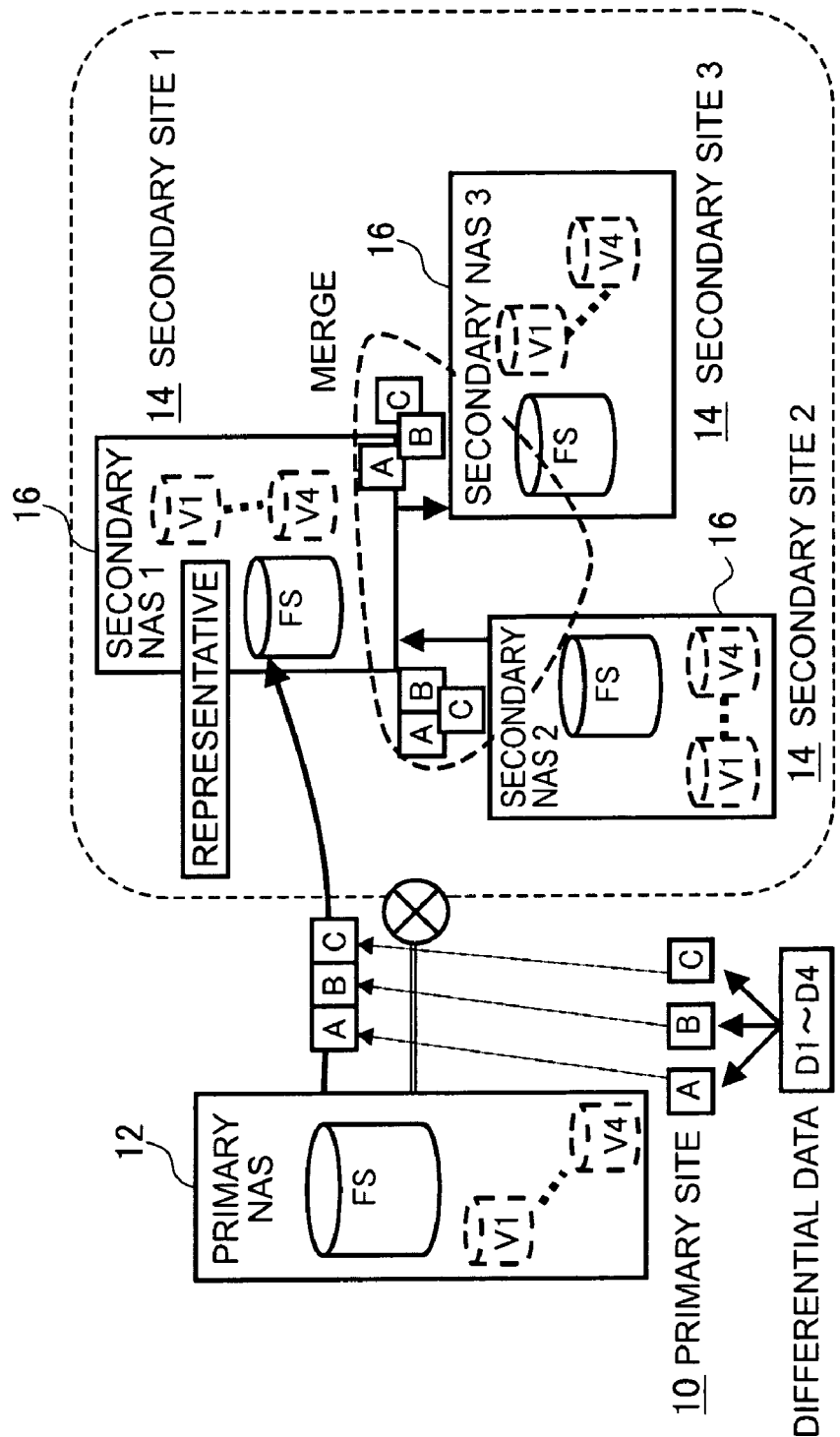
FIG. 21 is a conceptual diagram explaining the remote copy method when the number of representative secondary sites=1 as a case example of the fragment data distribution mode.

FIG. 21 shows a case example when the fragment data distribution mode is applied as the remote copy system in this remote copy system, and number of representative secondary sites was decided as "1." In this case example, the secondary site 14 referred to as the "secondary site 1" has been selected as the representative secondary site.

In the foregoing case, the primary NAS apparatus 12 partitions the differential data D1 to D4 to be remote-copied to the respective secondary NAS apparatuses 16 into the same number as the number of secondary sites ("3" in this case example), and transfers all of the obtained partitioned differential data A to C to the secondary NAS apparatus 16 referred to as the "secondary NAS 1" installed in the "secondary site 1."

The "secondary NAS 1" transfers the acquired partitioned differential data A to C to the secondary NAS apparatus 16 referred to as the "secondary NAS 2" installed in the secondary site 14 referred to as the "secondary site 2," and to the secondary NAS apparatus 16 referred to as the "secondary NAS 3" installed in the secondary site 14 referred to as the "secondary site 3," and the differential data D1 to D4 is reproduced respectively in the "secondary NAS 1," the "secondary NAS 2" and the "secondary NAS 3" based on the partitioned differential data A to C.

Figure 22:
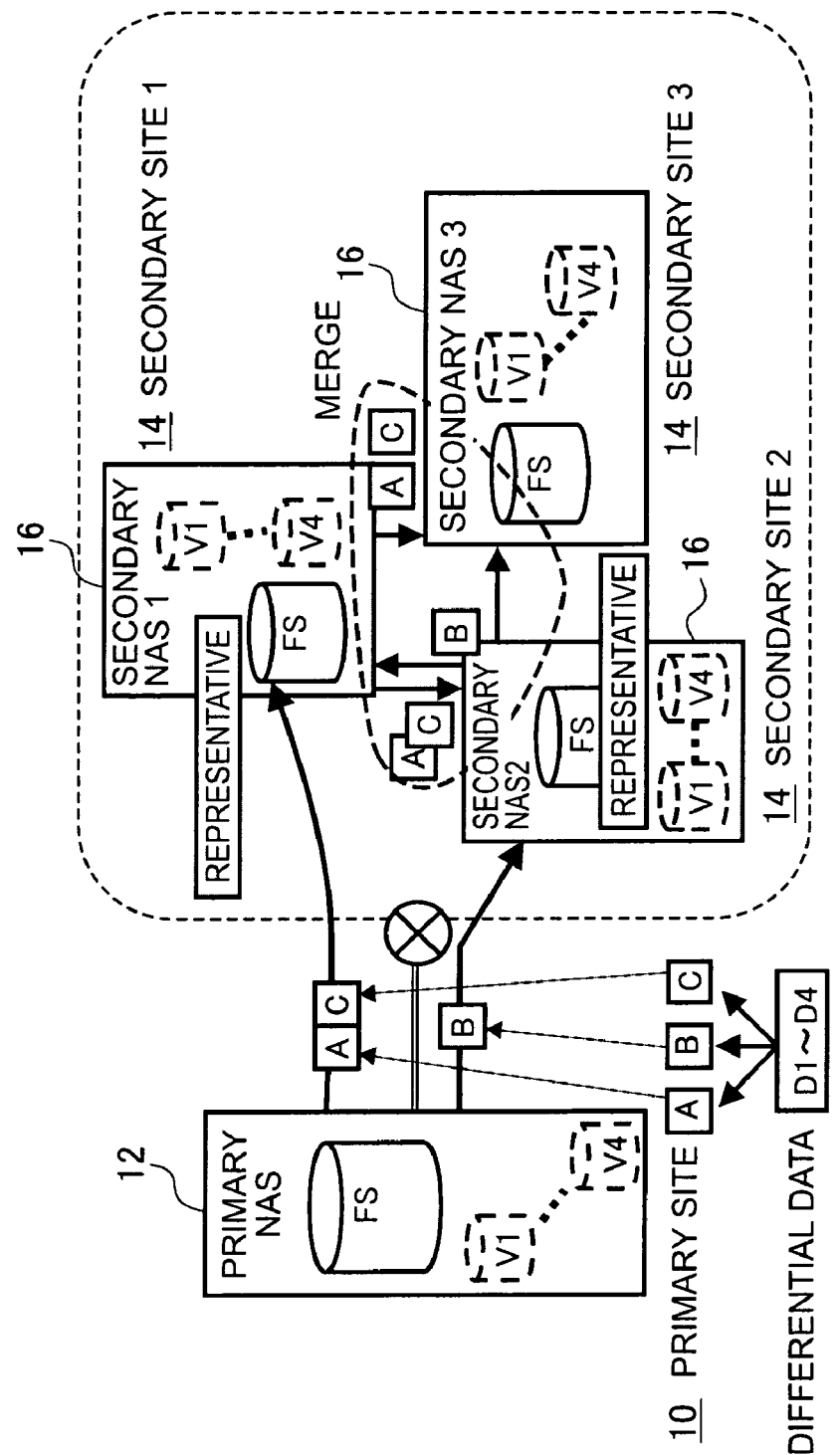
FIG. 22 is a conceptual diagram explaining the remote copy method when the number of representative secondary sites=2 as a case example of the fragment data distribution mode.

FIG. 22 shows a case example when the fragment data distribution mode is applied as the remote copy system in this remote copy system, and number of representative secondary sites was decided as "2." In this case example, the "secondary site 1" and the "secondary site 2" have been selected as the representative secondary sites.

In the foregoing case, the primary NAS apparatus 12 partitions the differential data D1 to D4 into the same number as the number of secondary sites, and, among the obtained partitioned differential data A to C, transfers the partitioned differential data A, C to the "secondary NAS 1" and transfers the partitioned differential data B to the "secondary NAS 2." The "secondary NAS 1," the "secondary NAS 2" and the "secondary NAS 3" respectively acquire all partitioned differential data A to C by exchanging the partitioned differential data A to C that they respectively acquired with the other secondary NAS apparatuses, and reproduces the differential data D1 to D4 based on the foregoing partitioned differential data A to C.

Figure 23:
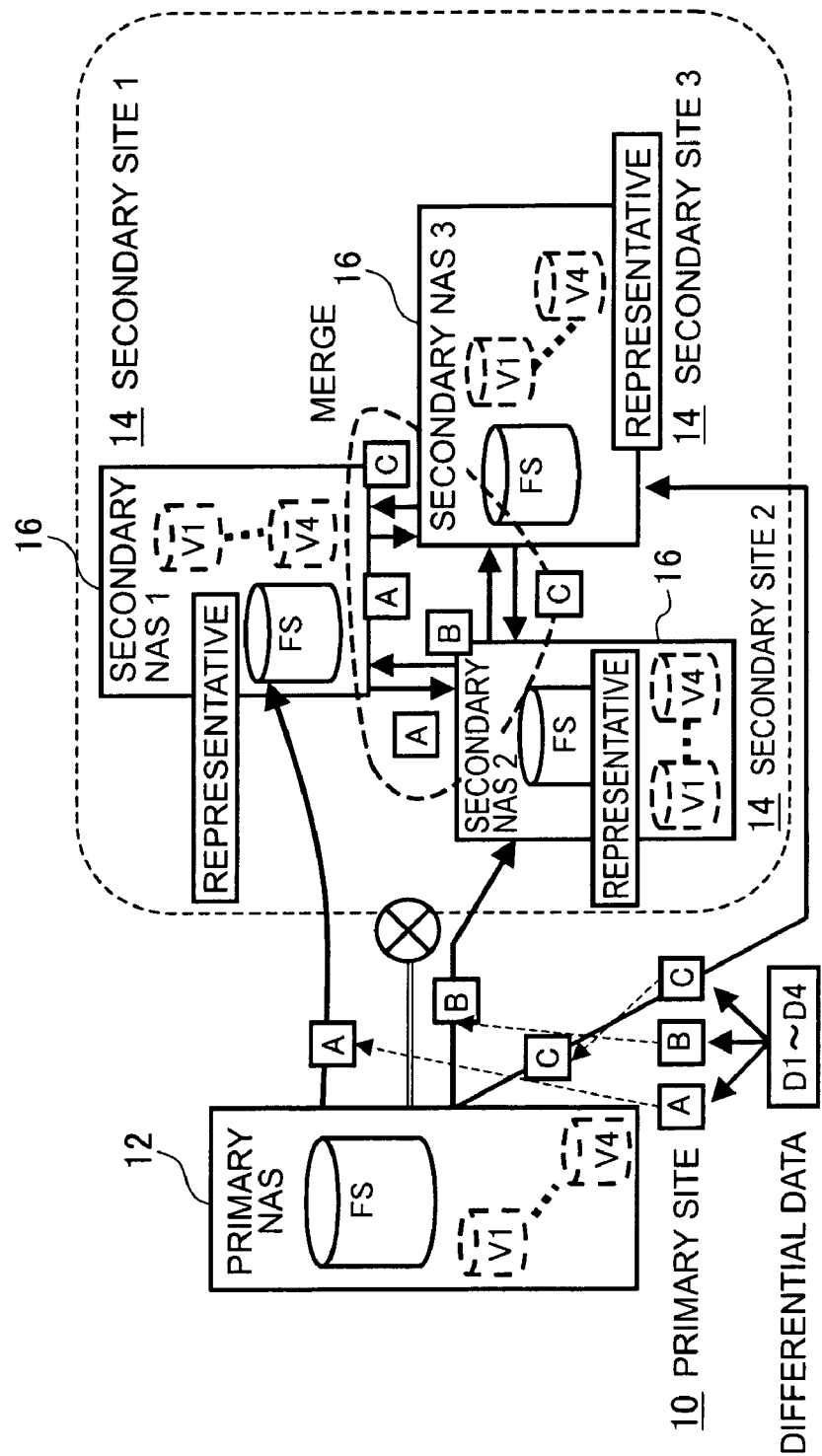
FIG. 23 is a conceptual diagram explaining the remote copy method when the number of representative secondary sites=3 as a case example of the fragment data distribution mode.

FIG. 23 shows a case example when the fragment data distribution mode is applied as the remote copy system in this remote copy system, and number of representative secondary sites was decided as "3." In this case example, the "secondary site 1," the "secondary site 2" and the "secondary site 3" have been selected as the representative secondary sites.

In the foregoing case, partitions the primary NAS apparatus 12 partitions the differential data D1 to D4 into three partitioned differential data A to C, and transfers the partitioned differential data A to the "secondary NAS 1," transfers the partitioned differential data B to the "secondary NAS 2," and transfers the partitioned differential data C to the "secondary NAS 3," respectively. The "secondary NAS 1," the "secondary NAS 2" and the "secondary NAS 3" acquire all partitioned differential data A to C by exchanging the partitioned differential data A, B or C that they acquired with the other secondary NAS apparatuses, and reproduces the differential data D1 to D4 based on the foregoing partitioned differential data A to C.

Figure 24:
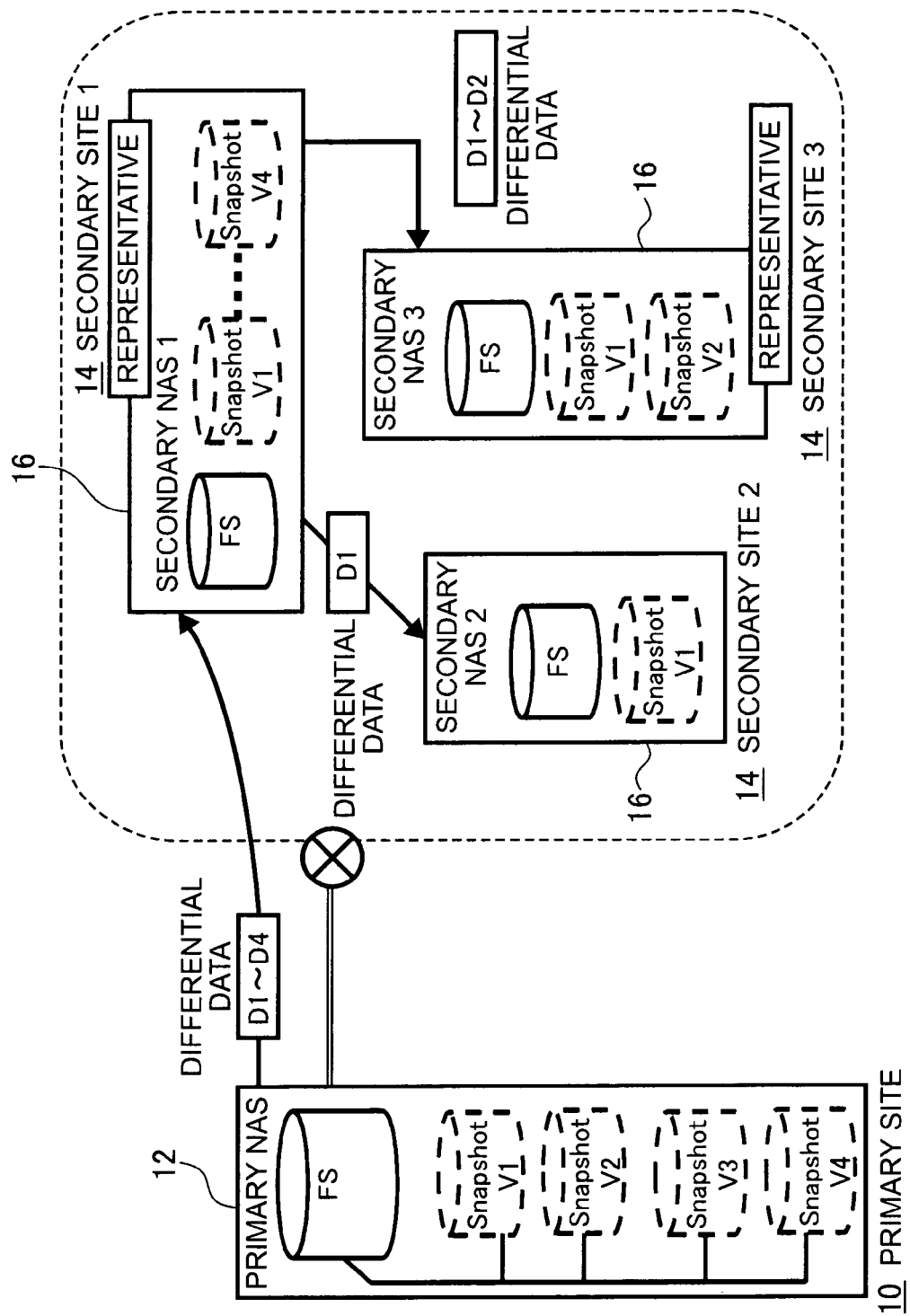
FIG. 24 is a conceptual diagram explaining the remote copy method when the number of representative secondary sites=1 as a case example of the snapshot generation unit distribution mode.

Meanwhile, FIG. 24 shows a case example when the snapshot generation unit distribution mode is applied as the remote copy mode in this remote copy system, and the number of representative secondary sites was decided as "1." In this case example, the "secondary site 1" is selected as the representative secondary site.

In the foregoing case, the primary NAS apparatus 12 transfers, to the "secondary NAS 1," the respective differential data D1 to D4 concerning the snapshot of the first to fourth generations to be transferred to the respective secondary sites 14. Then, based on the control of the monitoring server 20, the "secondary NAS 1" transfers the differential data D1 concerning the snapshot of the first generation among the acquired differential data D1 to D4 to the "secondary NAS 2," and transfers the differential data D1, D2 concerning the snapshot of the first and second generations to the "secondary NAS 3."

Figure 25:
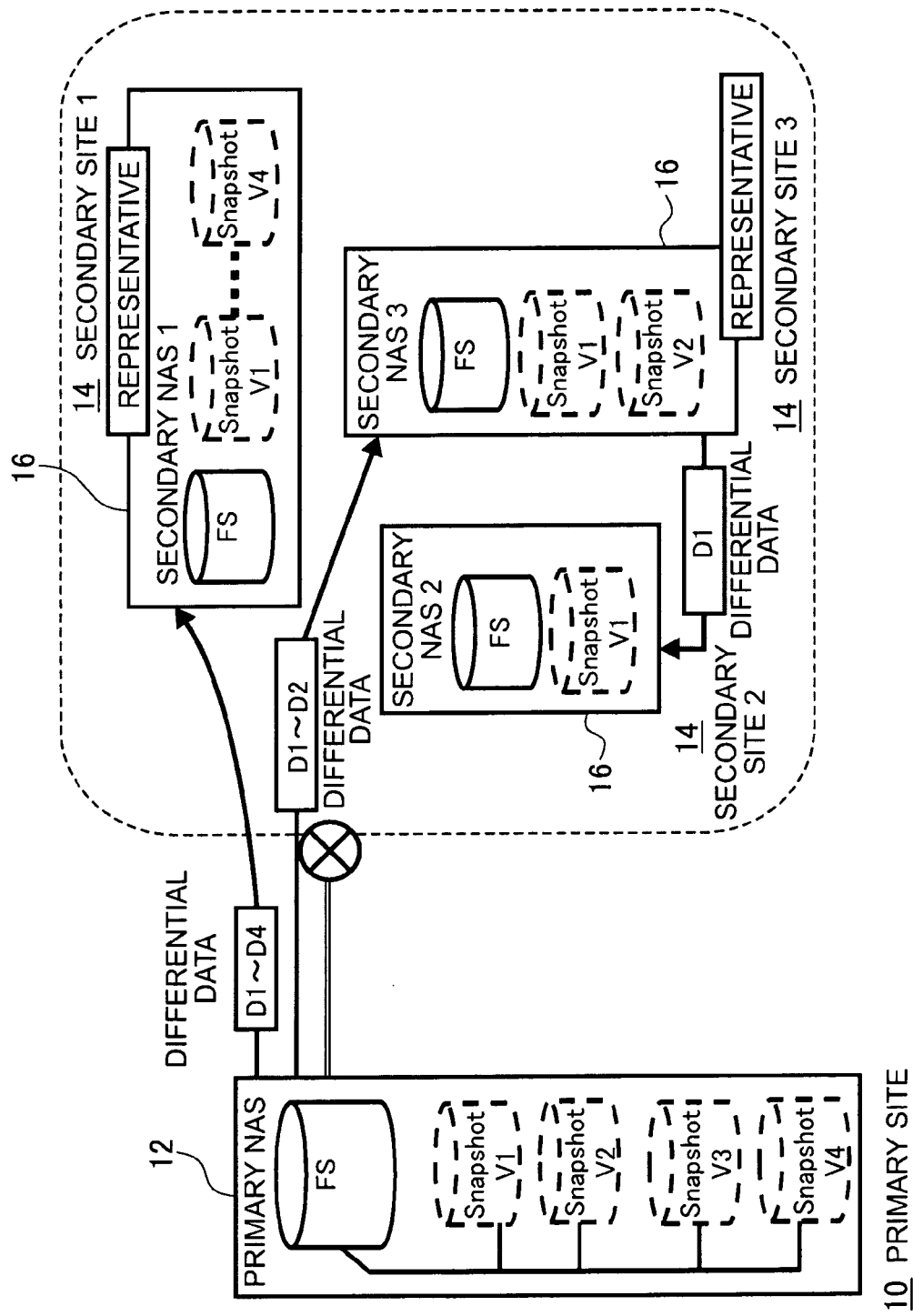
FIG. 25 is a conceptual diagram explaining the remote copy method when the number of representative secondary sites=2 as a case example of the snapshot generation unit distribution mode.

FIG. 25 shows a case example when the snapshot generation unit distribution mode is applied as the remote copy mode in this remote copy system, and the number of representative secondary sites was decided as "2." In this case example, the "secondary site 1" and the "secondary site 3" are selected as the representative secondary sites.

In the foregoing case, the primary NAS apparatus 12 transfers the differential data D1 to D4 concerning all snapshots of the first to fourth generations to the "secondary NAS 1," and transfers the differential data V1, V2 concerning the snapshot of the first and second generations to the "secondary NAS 3." The "secondary NAS 3" transfers the differential data D1 concerning the snapshot of the first generation among the acquired differential data D1, D2 to the "secondary NAS 2."

Figure 26:
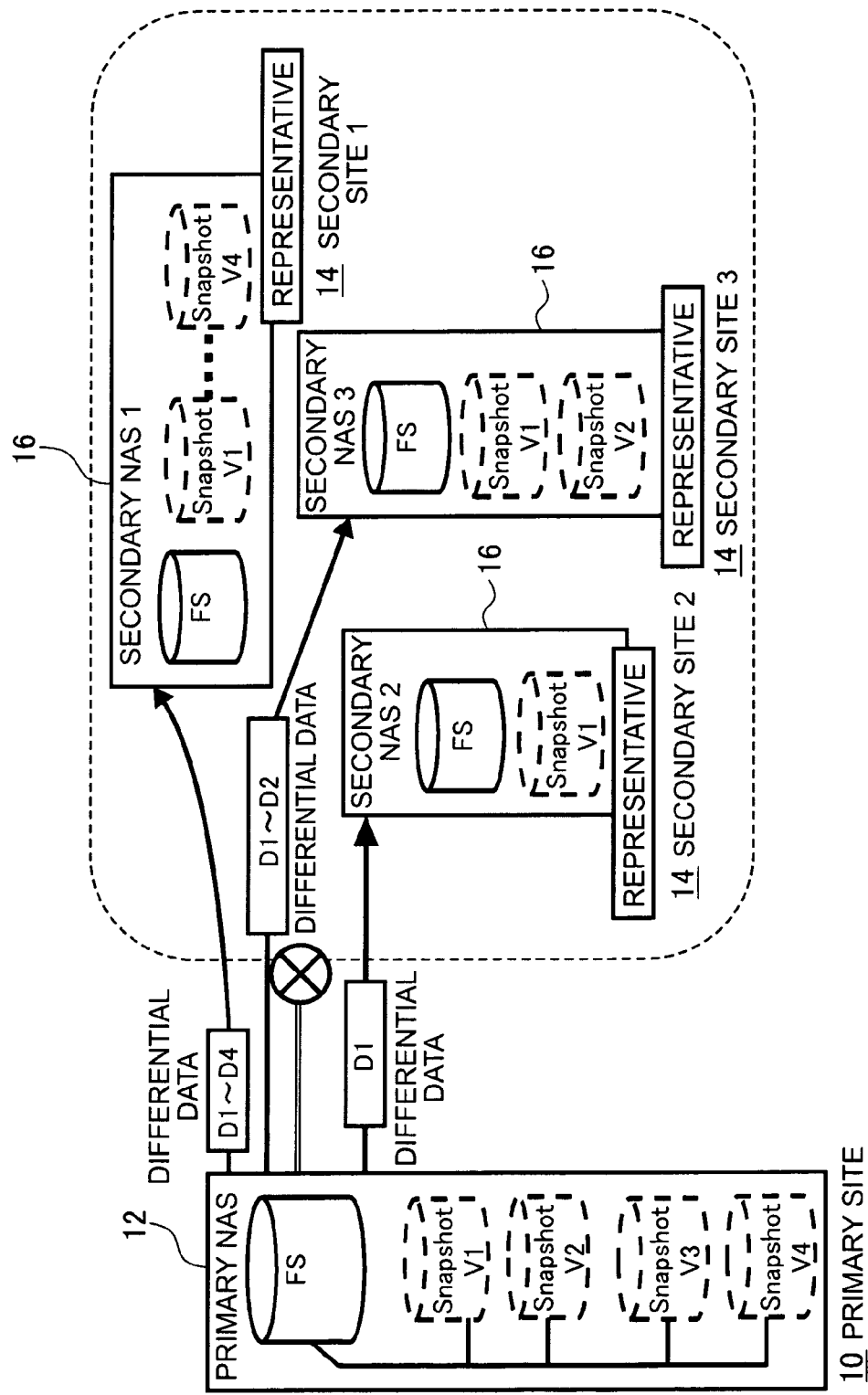
FIG. 26 is a conceptual diagram explaining the remote copy method when the number of representative secondary sites=3 as a case example of the snapshot generation unit distribution mode.

FIG. 26 shows a case example when the snapshot generation unit distribution mode is applied as the remote copy mode in this remote copy system, and the number of representative secondary sites was decided as "3." In this case example, the "secondary site 1," the "secondary site 2," and the "secondary site 3" are selected as the representative secondary sites.

In the foregoing case, the primary NAS apparatus 12 transfers the differential data D1 to D4 concerning all snapshots of the first to fourth generations to the "secondary NAS 1," transfers the differential data D1 concerning the snapshot of the first generation to the "secondary NAS 2," and transfers the differential data D1, D2 concerning the snapshot of the first and second generations to the "secondary NAS 3."

In the snapshot generation unit distribution mode, it is not necessarily the case that all snapshots are being retained in all secondary sites 14. Accordingly, upon switching the copy mode from the remote copy mode to the fragment data distribution mode in the foregoing state, it is necessary to copy the differential data D1 to D4 of the snapshots which are absent in the secondary NAS apparatus 16 among the secondary NAS apparatuses 16 so that the respective secondary NAS apparatuses 16 are retaining the snapshot of all generations.

Thus, in this embodiment, upon switching the copy mode from the remote copy mode to the fragment data distribution mode, the respective secondary NAS apparatuses 16 search for the generation of the snapshot retained in the secondary NAS apparatus 16 installed in the respective secondary sites 14 from the pair information management table T1 (FIG. 1), and acquires the snapshot of a generation that is not retained in the self-NAS apparatus 16 from another secondary NAS apparatus 16.

For instance, in the case of the examples illustrated in FIG. 24 to FIG. 26, as shown in FIG. 27, the secondary NAS apparatus 16 installed in the secondary site 14 referred to as the "secondary site 2" acquires the differential data D3, D4 concerning the snapshot of the respective generations referred to as "V3" and "V4" via remote copy from the secondary NAS apparatus 16 installed in the secondary site 14 referred to as the "secondary site 1." Moreover, the secondary NAS apparatus 16 installed in the secondary site 14 referred to as the "secondary site 2" acquires the differential data D2 to D4 concerning the snapshot of the respective generations of "V2" to "V4" via remote copy from the secondary NAS apparatus 16 installed in the secondary site 14 referred to as the "secondary site 1" or the secondary NAS apparatus 16 installed in the secondary site 14 referred to as the "secondary site 2."

(3) Specific Processing Contents of Respective Programs
(3-1) Configuration of Respective Programs The specific processing contents of the various programs concerning the foregoing remote copy function and remote copy control function are now explained. Foremost, the specific configuration of the respective programs related to the remote copy function and the remote copy control function is explained.

Figure 28:
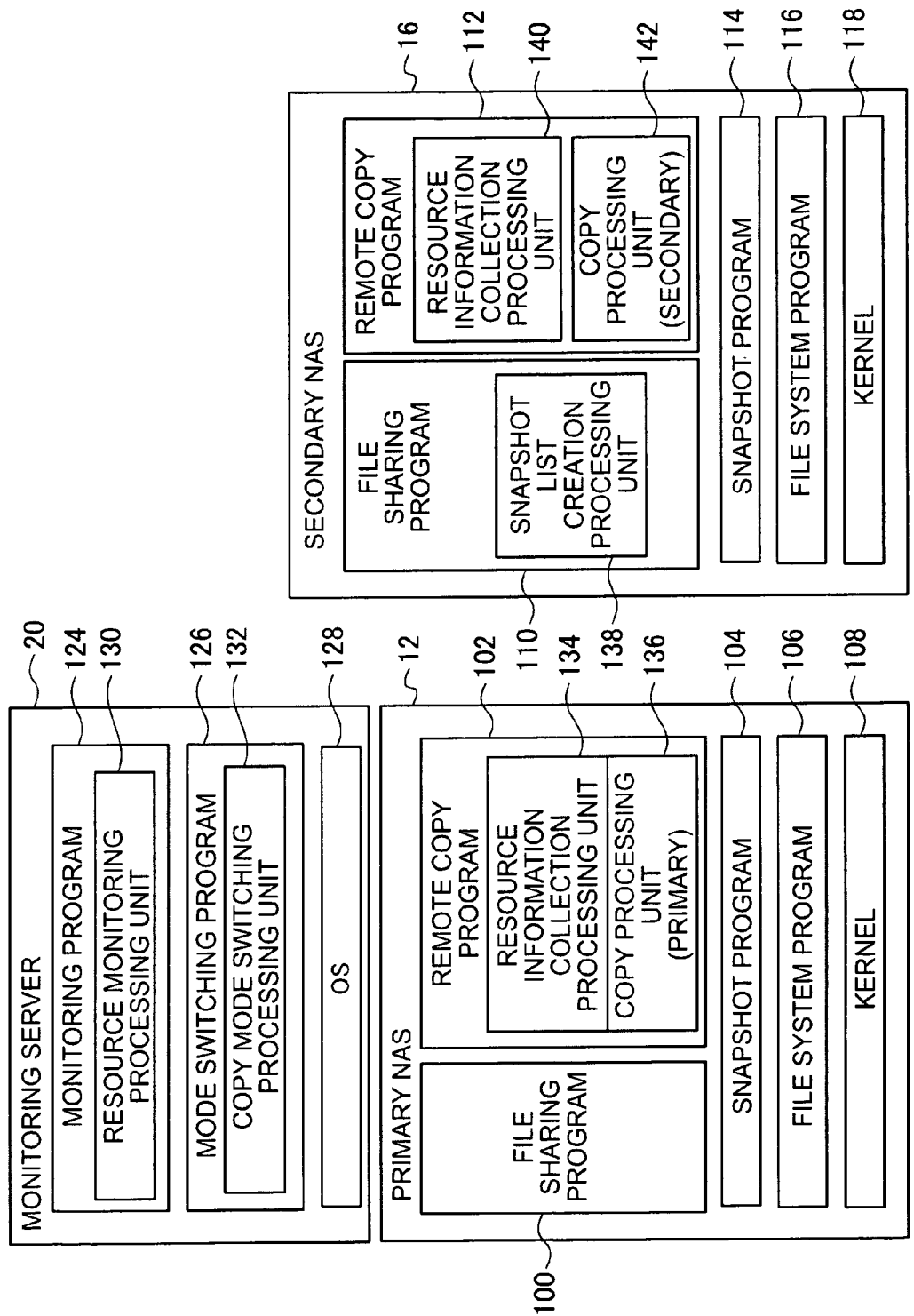
FIG. 28 is a conceptual diagram explaining the specific configuration of the program.

FIG. 28 shows the specific configuration of the monitoring program 124 and the mode switching program 126 of the monitoring server 20, the remote copy program 102 of the primary NAS apparatus 12, and the file sharing program 110 and the remote copy program 112 of the secondary NAS apparatus 16.

As shown in FIG. 28, the monitoring program 124 of the monitoring server 20 comprises a resource monitoring processing unit 130, and the mode switching program 126 comprises a copy mode switching processing unit 132.

The remote copy program 102 of the primary NAS apparatus 12 comprises a resource information collection processing unit 134 and a copy processing unit 136. The file sharing program 110 of the secondary NAS apparatus 16 comprises a snapshot list creation processing unit 138, and the remote copy program 112 comprises a resource information collection processing unit 140 and a copy processing unit 142.

Figure 29:
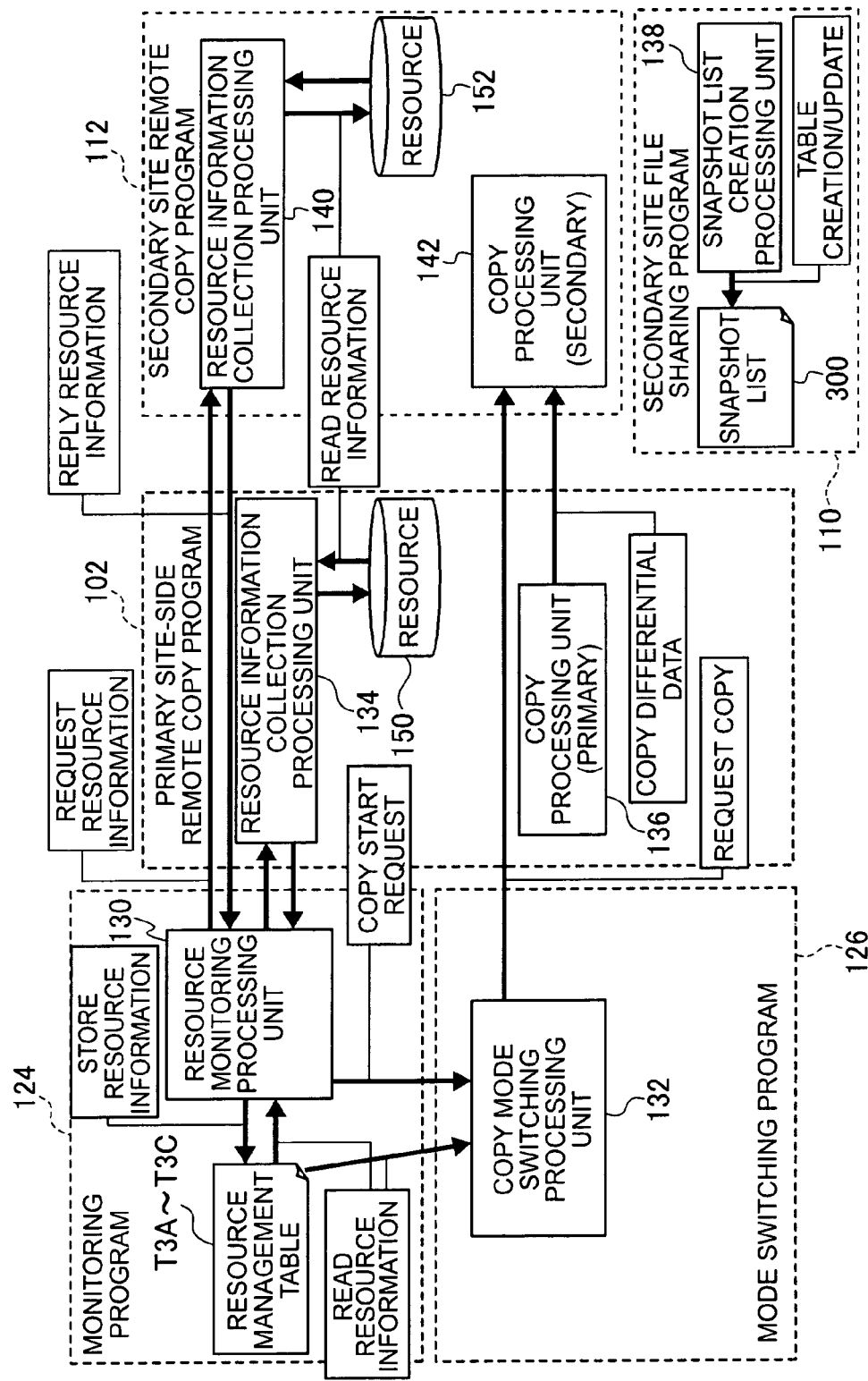
FIG. 29 is a conceptual diagram explaining the specific configuration of the program.

FIG. 29 shows the correlation among the foregoing resource monitoring processing unit 130 of the monitoring program 124, the copy mode switching processing unit 132 of the mode switching program 126, the resource information collection processing unit 134 and the copy processing unit 136 of the remote copy program 102 of the primary NAS apparatus 12, the resource information collection processing unit 140 and the copy processing unit 142 of the remote copy program 112 of the secondary NAS apparatus 16, and the snapshot list creation processing unit 138 of the file sharing program 110 of the secondary NAS apparatus 16.

As shown in FIG. 29, the resource monitoring processing unit 130 of the monitoring server 20 stores the information (this is hereinafter referred to as the "resource information") concerning the usage status of resources in the primary NAS apparatus 12 and the respective secondary NAS apparatuses 16 in the first to third resource management tables T3A to T3C, reads the resource information from the first to third resource management tables T3A to T3C, and outputs a copy start request to the copy mode switching processing unit 132.

The resource monitoring processing unit 130 requests the resource information to the resource information collection processing unit 134 of the primary NAS apparatus 12 and the resource information collection processing unit 140 of the secondary NAS apparatus 16, and inputs the reply of the resource information from the resource information collection processing units 134, 140. The resource monitoring processing unit 130 also outputs a copy start request to the copy mode switching processing unit 132.

The copy mode switching processing unit 132 requests the copy processing to the copy processing unit 142 of the secondary NAS apparatus 16 in response to the copy start request from the resource monitoring processing unit 130, and reads the resource information from the first to third resource management tables T3A to T3C.

Meanwhile, the resource information collection processing unit 134 of the primary NAS apparatus 12 reads the resource information concerning the resource 150 of the primary NAS apparatus 12. The copy processing unit 136 of the primary NAS apparatus 12 copies the differential data to the copy processing unit 142 in the secondary NAS apparatus 16.

Moreover, the resource information collection processing unit 140 of the secondary NAS apparatus 16 collects the resource information from the resource 152 of the secondary NAS apparatus 16, and outputs the collected resource information to the resource monitoring processing unit 130 of the monitoring server 20.

The snapshot list creation processing unit 138 creates the snapshot list 300 (FIG. 11), and also updates the contents of the created snapshot list 300 as needed.

(3-2) Resource Monitoring Processing

Figure 30:
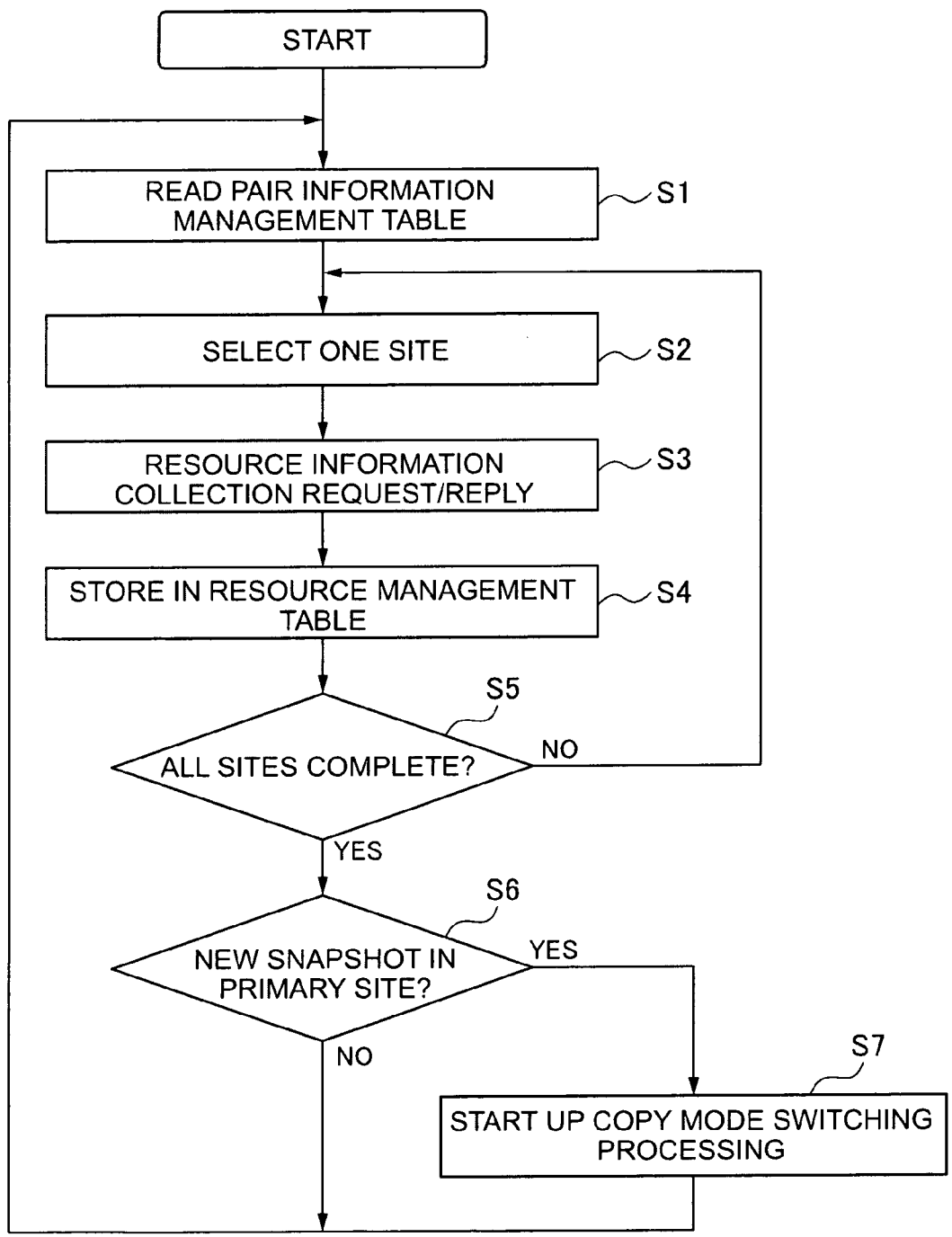
FIG. 30 is a flowchart explaining the operation of the resource monitoring processing unit.

FIG. 30 shows the specific processing contents of the resource monitoring processing unit 130 of the monitoring program 124 concerning the collection of the resource information of the primary NAS apparatus 12 and the respective secondary NAS apparatuses 16.

The resource monitoring processing unit 130 starts this resource monitoring processing when the power of the monitoring server 20 is turned on, and foremost reads the information stored in the pair information management table T1 (S1).

Subsequently, the resource monitoring processing unit 130 selects one site (primary site 10 or secondary site 14) among all sites in the remote copy system in which the processing of step S3 onward is unexecuted (S2).

Subsequently, the resource monitoring processing unit 130 sends a resource information collection request to the NAS apparatus (primary NAS apparatus 12 or secondary NAS apparatus 16) installed in the site that was selected at step S2 to collect information regarding the usage status of resources, and receives the reply to such resource information collection request from the NAS apparatus (S3).

Subsequently, the resource monitoring processing unit 130 stores the resource usage status information received at step S3 in the first to third resource management tables T3A to T3C (S4), determines whether the same processing has been executed regarding all sites (S5), and returns to step S2 upon obtaining a negative result. The resource monitoring processing unit 130 thereafter repeats the same processing until it receives a positive result at step S5.

When the resource monitoring processing unit 130 thereafter completes the collection of resource information from all sites, it determines whether a new snapshot in which the transfer of the differential data D1 to D4 is incomplete has been created in the primary NAS apparatus 12 installed in the primary site 10 (S6).

If the resource monitoring processing unit 130 obtains a negative result in the foregoing determination, it returns to step S1, and thereafter repeats the same processing. Meanwhile, if the resource monitoring processing unit 130 obtains a positive result in the determination at step S6, it starts up the copy mode switching processing unit 132 of the mode switching program 126 (S7), and thereafter returns to step S1 and repeats the same processing.

(3-3) Resource Information Collection Processing

Figure 31:
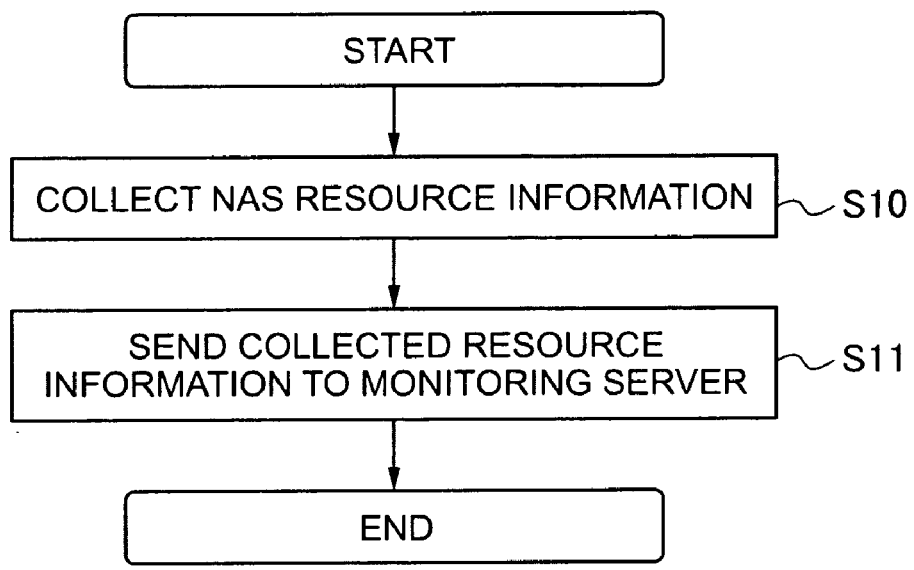
FIG. 31 is a flowchart showing the processing routine of the resource information collection processing.

FIG. 31 shows the specific processing contents of the resource information collection processing to be executed by the resource information collection processing units 134, 140 of the primary NAS apparatus 12 or secondary NAS apparatus 16 that received the resource information collection request which was sent from the resource monitoring processing unit 130 at step S3 of the resource monitoring processing described above with reference to FIG. 30.

When the resource information collection processing unit 134 or 140 receives the foregoing resource information collection request, it starts this resource information collection processing and foremost collects the measured values of the resource usage such as the utilization of the CPU 32, 50 (FIG.

1) in the self-NAS apparatus (primary NAS apparatus 12 or secondary NAS apparatus 16), usage of the memory 30, 48 (FIG. 1), the write data amount and read data amount per second in and from the memory device 26, 44 (FIG. 1) in the self-NAS apparatus, and usage of the network band based on the communication with other NAS apparatuses, and calculates the average value of the collected measured values of the resource usage for each resource (CPU 32, 50, memory 30, 48, memory device 26, 44, NIC, etc.) (S10).

Specifically, since the measured values of the resource usage such as the utilization of the CPU 32, 50, usage of the memory 30, 48, the write data amount and read data amount per second in and from the memory device 26, 44, and usage of the network band based on the communication with other NAS apparatuses are acquired and stored in the primary NAS apparatus 12 and the respective secondary NAS apparatuses 16 at regular time intervals, the processing of step S10 is performed by calculating the average values of the stored corresponding resource usage for each resource.

Here, the resource information collection processing unit 134, 140 does not use the average value of the resource usage regarding the measured values that were acquired regarding the resources in which the remote copy was being performed, and calculates the respective average values of the resource usage by using only the measured values that were acquired during the time period that the remote copy was not executed.

Subsequently, the resource information collection processing unit 134, 140 sends the average values of the resource usage for each resource calculated as described above to the monitoring server 130 as the resource information for each resource (S11). The resource information collection processing unit 134, 140 thereafter ends this resource information collection processing.

(3-4) Copy Request Issue Processing

Figure 32:
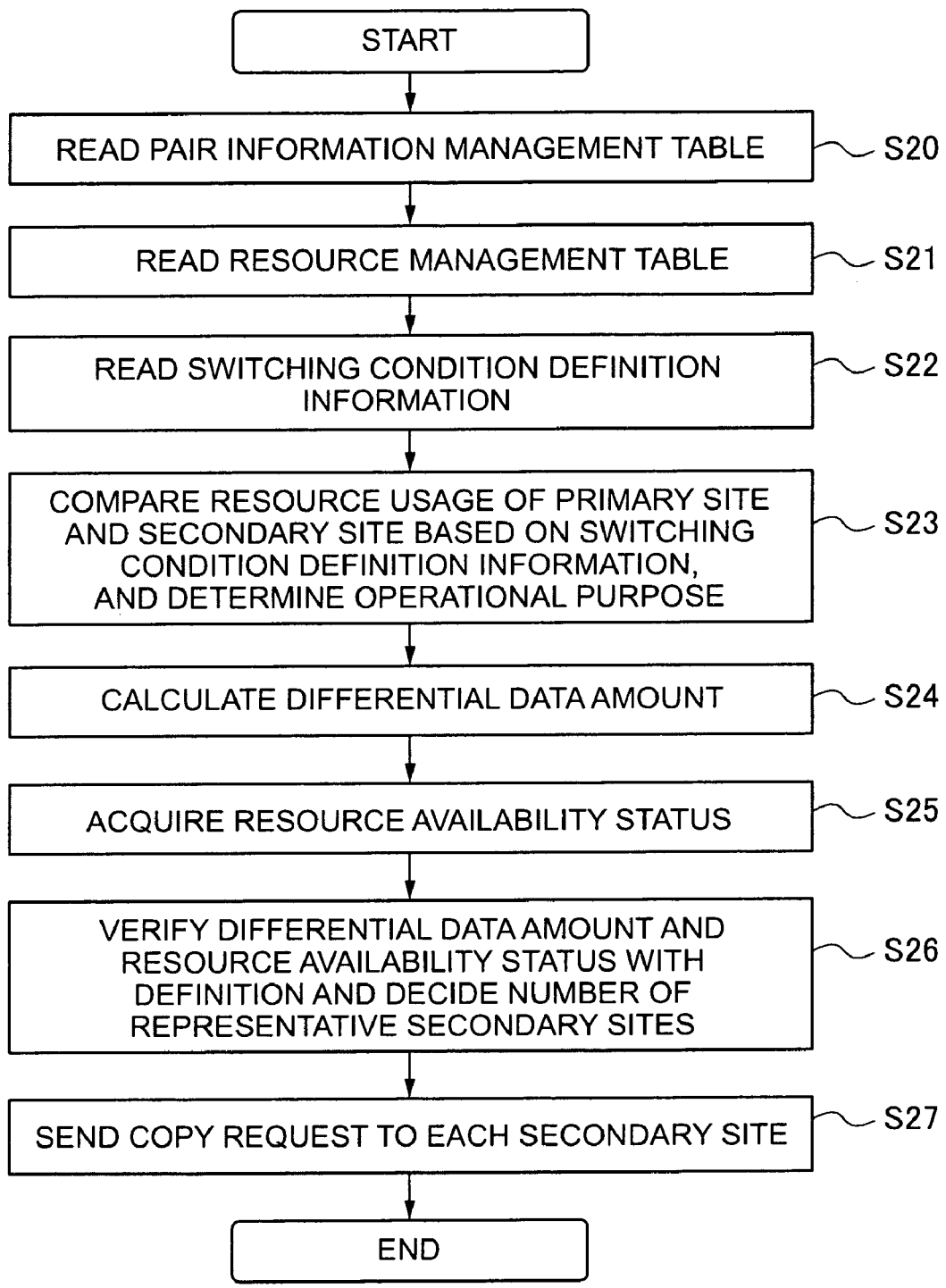
FIG. 32 is a flowchart showing the processing routine of the copy request issue processing.

FIG. 32 shows the processing routine of the copy request issue processing to be executed by the copy mode switching processing unit 132 of the mode switching program 126 which was started up at step S7 of the resource monitoring processing described above with reference to FIG. 30.

When the copy mode switching processing unit 132 is started up by the resource monitoring processing unit 130 at step S7 of the resource monitoring processing, it starts this copy request issue processing and foremost sequentially reads the information stored in the pair information management table T1 (FIG. 1) and the respective first to third resource management tables T3A to T3C (FIG. 5A to FIG. 5C), and the pre-registered switching condition definition information (FIG. 18) (S20 to S22).

Subsequently, the copy mode switching processing unit 132 determines whether the operational purpose of the secondary site 14 is a backup site purpose or a mirror site purpose in the target copy pair based on the respective pieces of information acquired at step S20 to step S22 (S23).

Specifically, the copy mode switching processing unit 132 specifies the primary NAS apparatus 12 and the respective secondary NAS apparatuses 16 configuring the target copy pair based on the pair information management table T1 read at step S20, and acquires the resource information for each of the primary NAS apparatus 12 and the secondary NAS apparatuses 16 based on the first to third resource management tables T3A to T3C read at step S21. The copy mode switching processing unit 132 thereafter compares the acquired resource information for each of the primary NAS apparatus 12 and the secondary NAS apparatuses 16 with the resource usage of the primary NAS apparatus 12 and the respective secondary NAS apparatuses 16, and determines whether the operational purpose of the secondary site 14 is a backup site purpose or a mirror site purpose based on the comparative result and the switching condition definition information acquired at step SP22.

Subsequently, the copy mode switching processing unit 132 calculates the differential data amount of the differential data to be transferred from the primary NAS apparatus 12 to the secondary NAS apparatus 16 based on the resource information read from the first to third resource management tables T3A to T3C (S24), and additionally calculates the resource availability status obtained by subtracting the average value of the current measured values from the upper limit regarding the necessary resources based on the resource information read from the first to third resource management tables T3A to T3C (S25).

Subsequently, the copy mode switching processing unit 132 decides the number of representative secondary sites and the representative secondary sites in that quantity based on the differential data amount calculated at step S24 and the resource availability status for each resource acquired at step S25 (S26).

The copy mode switching processing unit 132 thereafter sends a copy request respectively designating the copy mode, the copy-target snapshot and the representative secondary site to the respective secondary NAS apparatuses 16 configuring the target copy pair (S27), and thereafter ends this copy request issue processing.

(3-5) Remote Copy Processing Based on Fragment Data Distribution Mode

Figure 33:
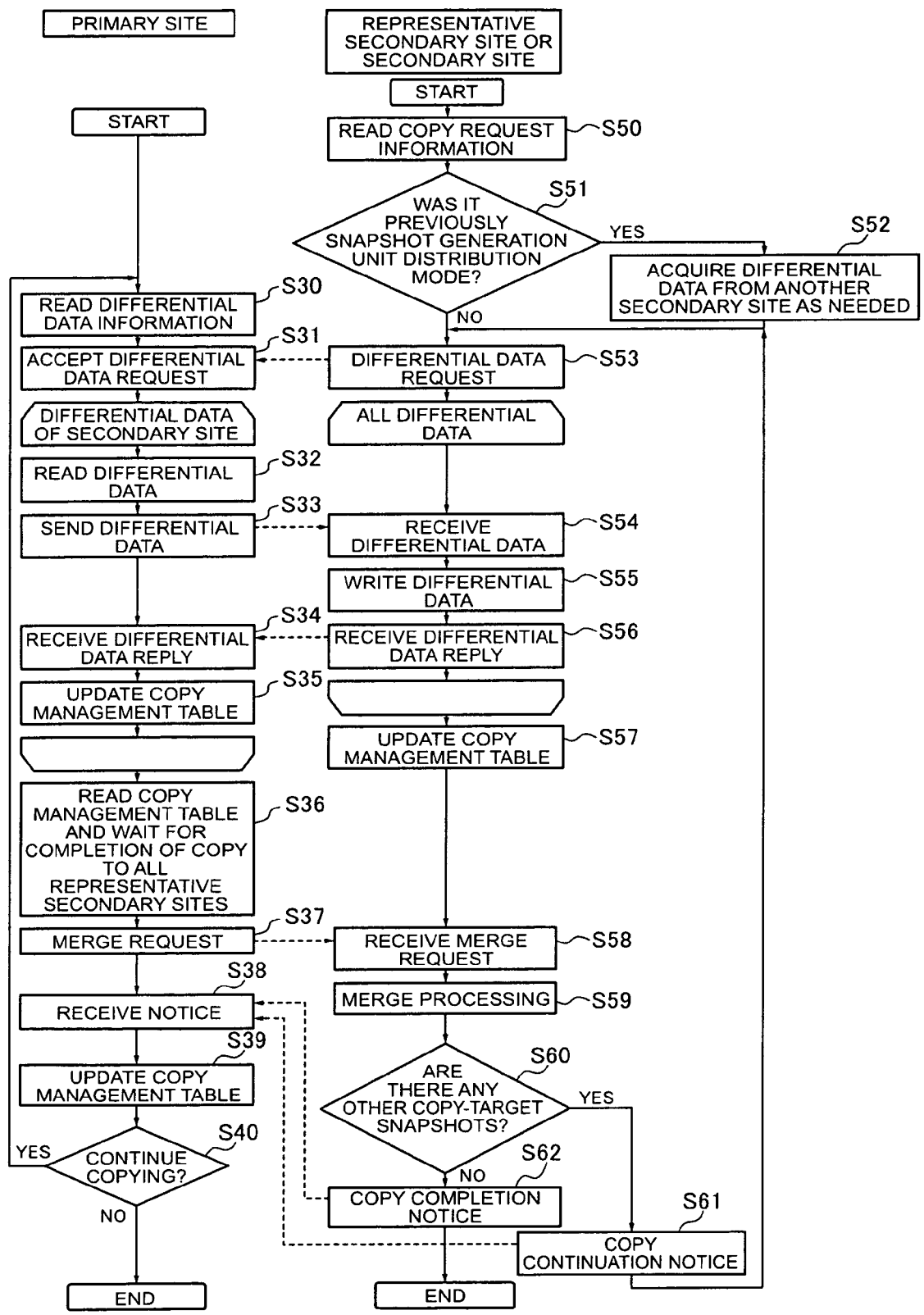
FIG. 33 is a flowchart showing the processing routine of the remote copy processing based on the fragment data distribution mode.

Meanwhile, FIG. 33 shows the processing routine of the remote copy processing to be respectively executed by copy processing unit (this is hereinafter referred to as the "primary-side copy processing unit") 136 of the primary NAS apparatus 12, and the copy processing unit (this is hereinafter referred to as the "secondary-side copy processing unit") 142 of the secondary NAS apparatus 16 installed in the representative secondary site 14 upon remote-copying the differential data based on the fragment data distribution mode from the primary NAS apparatus 12 that created a new snapshot to the secondary NAS apparatus 16 installed in the representative secondary site 14.

The primary-side copy processing unit 136 starts the first primary-side copy processing shown on the left side of FIG. 33 when a new snapshot is created in the primary NAS apparatus 12, and foremost reads the information (this is hereinafter referred to as the "snapshot differential information") concerning the differential between the new snapshot and the snapshot (this is hereinafter referred to as the "preceding snapshot") that was created preceding the new snapshot from the snapshot management information (S30).

Subsequently, the primary-side copy processing unit 136 receives the differential data request sent from the secondary NAS apparatus 16 installed in the representative secondary site 14 as described later (S31), and reads the differential data between the new snapshot and the preceding snapshot from the differential volume 36 (FIG. 1) based on the snapshot differential information acquired at step S30 (S32).

Subsequently, the primary-side copy processing unit 136 partitions the differential data that was read from the differential volume 36 at step S32 into the number of secondary sites, and sends a part or all of the corresponding differential data among the obtained partitioned differential data to the secondary NAS apparatus 16 (secondary NAS apparatus 16 installed in the representative secondary site 16) that sent the differential data request at step S31 (S33).

The primary-side copy processing unit 136 thereafter waits to receive a reception completion reply of the partitioned differential data from that secondary NAS apparatus 16, and, upon receiving such reception completion reply (S34), updates the copy mode field 226 (FIG. 4), the copy status field 228, the baseline field 230 (FIG. 4), copying field 232 (FIG. 4) and the copy-target snapshot field 234 (FIG. 4) of the corresponding entries in the copy management table T2 (FIG. 4) as needed (S35).

The primary-side copy processing unit 136 thereafter waits until the remote copy of the corresponding partitioned differential data to the secondary NAS apparatuses 16 installed in all of the representative secondary sites 14 is complete (S36). When the primary-side copy processing unit 136 eventually completes the remote copy of the partitioned differential data concerning the new snapshot to the secondary NAS apparatuses 16 installed in the respective representative secondary sites 14, it sends a merge request to the secondary NAS apparatuses 16 installed in the respective representative secondary sites 14 (S37).

When the primary-side copy processing unit 136 eventually receives a reply notice (copy completion notice or copy continuation notice) in response to the merge request sent from the secondary NAS apparatuses 16 installed in the respective representative secondary sites 14 as described later (S38), it updates the corresponding sections of the copy management table T2 (S39), and thereafter determines whether to continue the remote copy based on the foregoing reply notice (S40).

If the primary-side copy processing unit 136 obtains a positive result in the foregoing determination, it returns to step SP30, and thereafter repeats step S30 to step S40 in the same manner. When the primary-side copy processing unit 136 eventually obtains a negative result in the determination at step S40, it ends this first primary-side copy processing.

Meanwhile, when the secondary-side copy processing unit 142 of the secondary NAS apparatus 16 installed in the respective representative secondary sites 14 receives the copy request that was sent from the copy mode switching processing unit 132 of the monitoring server 20 at step S27 of the copy request issue processing described above with reference to FIG. 32, it starts the first secondary-side copy processing shown on the right side of FIG. 33, and foremost acquires information such as the copy mode, the copy-target snapshot and the representative secondary site 14, which are designated in that copy request, from the received copy request (S50).

Subsequently, the secondary-side copy processing unit 142 refers to the copy management table T2 (FIG. 4) and determines whether the copy mode that was applied in the previous remote copy processing was the snapshot generation unit distribution mode (S51).

If the secondary-side copy processing unit 142 obtains a negative result in the foregoing determination, it proceeds to step S53. Meanwhile, if the secondary-side copy processing unit 142 obtains a positive result in the foregoing determination, it acquires, from the other secondary sites 14, the differential data of the snapshot of the latest generation that is not retained in the self-NAS apparatus as needed (S52).

Subsequently, the secondary-side copy processing unit 142 sends, to the primary NAS apparatus 12, a differential data request to the effect of transferring the partitioned differential data of the new snapshot that was created in the primary NAS apparatus 12 (S53).

When the secondary-side copy processing unit 142 thereafter receives the partitioned differential data sent from the primary NAS apparatus 12 (S54), it writes that partitioned differential data into the differential volume 54 (FIG. 1) of the self-NAS apparatus (S55), and sends a differential data reception reply to the primary NAS apparatus 12 to the effect that the reception of the partitioned differential data is complete (S56).

When the secondary-side copy processing unit 142 acquires all partitioned differential data that is allocated to the self-NAS apparatus, it updates the copy mode field 226 (FIG. 4), the copy status field 228, the baseline field 230 (FIG. 4), the copying field 232 (FIG. 4) and the copy-target snapshot field 234 (FIG. 4) of the entries corresponding to the self-NAS apparatus in the copy management table T2 as needed (S57).

When the secondary-side copy processing unit 142 thereafter receives the merge request from the primary NAS apparatus 12 as described above (S58), it acquires all partitioned differential data of the new snapshot by exchanging the partitioned differential data with the secondary NAS apparatuses 16 installed in the other representative secondary sites 14, and writes this into the differential volume 54 (FIG. 1) (S59).

Subsequently, the secondary-side copy processing unit 142 determines whether there is a snapshot in which other differential data is to be remote-copied (S60). If the secondary-side copy processing unit 142 obtains a positive result in the foregoing determination, it sends a copy continuation notice to the effect of continuing the remote copy to the primary NAS apparatus 12 (S61), and thereafter returns to step S53.

Meanwhile, if the secondary-side copy processing unit 142 obtains a negative result in the determination at step S60, it sends a remote copy completion notice to the effect that the remote copy that was being executed is complete to the primary NAS apparatus 12 (S62), and thereafter ends this first secondary-side copy processing.

The secondary NAS apparatus 16 installed in the representative secondary site 14 thereafter transfers (remote-copies) the differential data concerning the new snapshot to the secondary NAS apparatus 16 installed in a secondary site 14 that is not selected as the representative secondary site 14 under the control of the monitoring server 20. The remote copy between the secondary NAS apparatus 16 installed in the representative secondary site 14 and the secondary NAS apparatus 16 installed in the secondary site 14 that is not a representative secondary site 14 in the foregoing case is basically performed the same as the first primary-side copy processing and the first secondary-side copy processing excluding the point that the merge processing is not performed.

Figure 34:
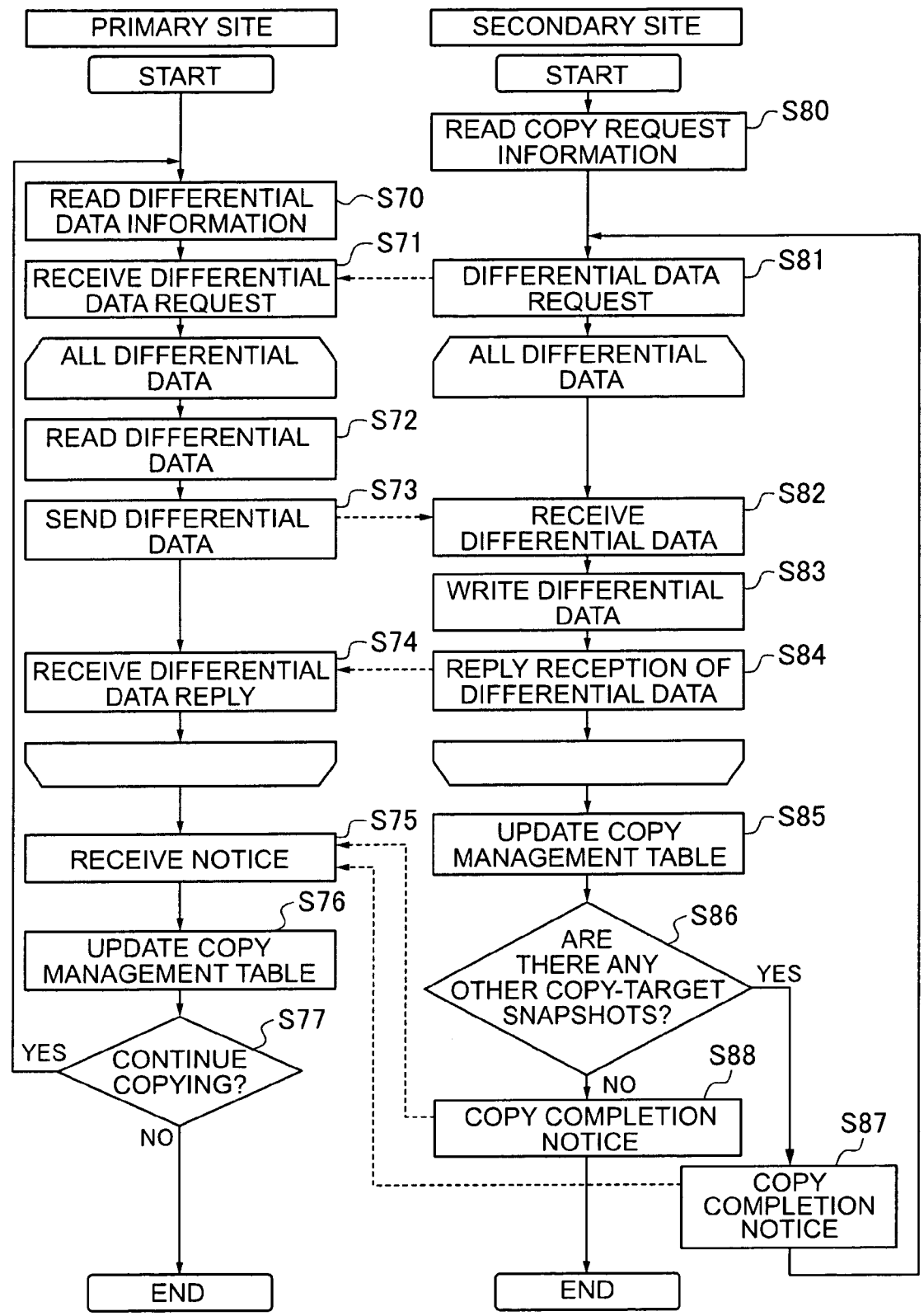
FIG. 34 is a flowchart showing the processing routine of the remote copy processing based on the snapshot generation unit distribution mode.

(3-6) Remote Copy Processing Based on Snapshot Generation Unit Distribution Mode Meanwhile, FIG. 34 shows the processing routine of the remote copy processing to be executed respectively by the primary-side copy processing unit 134 and the secondary-side copy processing unit 142 of the secondary NAS apparatus 16 upon remote-copying the differential data based on the snapshot generation unit distribution mode from the primary NAS apparatus 12 that created the new snapshot to the secondary NAS apparatus 16 installed in the representative secondary site 14.

The primary-side copy processing unit 136 starts the second primary-side copy processing shown on the left side of FIG. 34 when a new snapshot is created in the primary NAS apparatus 12, and foremost reads, from the snapshot management information, the snapshot differential information concerning the differential between the new snapshot and the preceding snapshot (S30).

Subsequently, the primary-side copy processing unit 136 receives a differential data request from the secondary NAS apparatus 16 installed in the representative secondary site 14 described later (S71), and reads, from the differential volume 36 (FIG. 1), the differential data between the new snapshot and the preceding snapshot based on the snapshot differential information acquired at step S70 (S72).

Subsequently, the primary-side copy processing unit 136 sends the differential data that was read from the differential volume 36 at step S72 to the secondary NAS apparatus 16 that sent the differential data request at step S71 (S73).

The primary-side copy processing unit 136 thereafter waits to receive the reception completion reply of the differential data from the secondary NAS apparatus 16, and, upon receiving the reception completion reply (S74), waits to receive a copy completion notice to the effect that the copy of the new snapshot from the respective secondary NAS apparatuses 16 installed in all representative secondary sites 14 designated by the monitoring server 20 is complete, or a copy continuation notice to the effect of continuing the copy (S75).

When the primary-side copy processing unit 136 eventually receives the copy completion notice or the copy continuation notice from the respective secondary NAS apparatuses 16 installed in all representative secondary sites 14 designated by the monitoring server 20, it updates the copy mode field 226 (FIG. 4), the copy status field 228, the baseline field 230 (FIG. 4), the copying field 232 (FIG. 4) and the copy-target snapshot field 234 (FIG. 4) of the corresponding entries in the copy management table T2 (FIG. 4) as needed (S76).

The primary-side copy processing unit 136 thereafter determines whether to continue the remote copy based on the respective copy completion notices or the copy continuation notices that were received at step SP75 (S77).

If the primary-side copy processing unit 136 receives a positive result in the foregoing determination, it returns to step SP70 and thereafter repeats step S70 to step S77 in the same manner. When the primary-side copy processing unit 136 eventually obtains a negative result in the determination at step S77, it ends this second primary-side copy processing.

Meanwhile, when the secondary-side copy processing unit 142 installed in the representative secondary site 14 designated in the copy request receives the copy request that was sent from the copy mode switching processing unit 132 of the monitoring server 20 at step S27 of the copy request issue processing described above with reference to FIG. 32, it starts the second secondary-side copy processing shown on the right side of FIG. 34, and foremost acquires, from the received copy request, information such as the copy mode, the copy-target snapshot and the representative secondary site designated in that copy request (S80).

Subsequently, the secondary-side copy processing unit 142 sends to the primary NAS apparatus 12 a differential data request to the effect of transferring the differential data of the new snapshot that was created in the primary NAS apparatus 12 (S81).

When the secondary-side copy processing unit 142 thereafter receives the differential data that was sent from the primary NAS apparatus 12 (S82), it writes such differential data into the differential volume 54 (FIG. 1) of the self-NAS apparatus (S83), and sends to the primary NAS apparatus 12 a differential data reception reply to the effect that the reception of the differential data is complete (S84).

When the secondary-side copy processing unit 142 acquires all differential data of the new snapshot, it updates the copy mode field 226 (FIG. 4), the copy status field 228, the baseline field 230 (FIG. 4), the copying field 232 (FIG. 4) and the copy-target snapshot field 234 (FIG. 4) of the entries corresponding to the self-NAS apparatus in the copy management table T2 as needed (S85).

Subsequently, the secondary-side copy processing unit 142 determines whether there is a snapshot in which other differential data should be remote-copied (S86). If the secondary-side copy processing unit 142 obtains a positive result in the foregoing determination, it sends a copy continuation notice to the effect of continuing the remote copy to the primary NAS apparatus 12 (S87), and thereafter returns to step S81.

Meanwhile, if the secondary-side copy processing unit 142 obtains a negative result in the determination at step S86, it sends a remote copy completion notice to the effect that the remote copy that was being executed is complete to the primary NAS apparatus 12 (S88), and thereafter ends this first secondary-side copy processing.

The secondary NAS apparatus 16 that received the differential data concerning the new snapshot thereafter transfers (remote-copies) the differential data concerning the new snapshot to the secondary NAS apparatus 16 installed in a necessary secondary site 14 among the secondary sites 14 that are not selected as the representative secondary site 14 under the control of the monitoring server 20. The remote copy between the secondary NAS apparatus 16 installed in the representative secondary site 14 and the secondary NAS apparatus 16 installed in the secondary site 14 that is not a representative secondary site 14 in the foregoing case is basically performed the same as the first primary-side copy processing and the first secondary-side copy processing excluding the point that the merge processing is not performed.

(3-7) Snapshot Reference Map Creation/Update Processing

Figure 35:
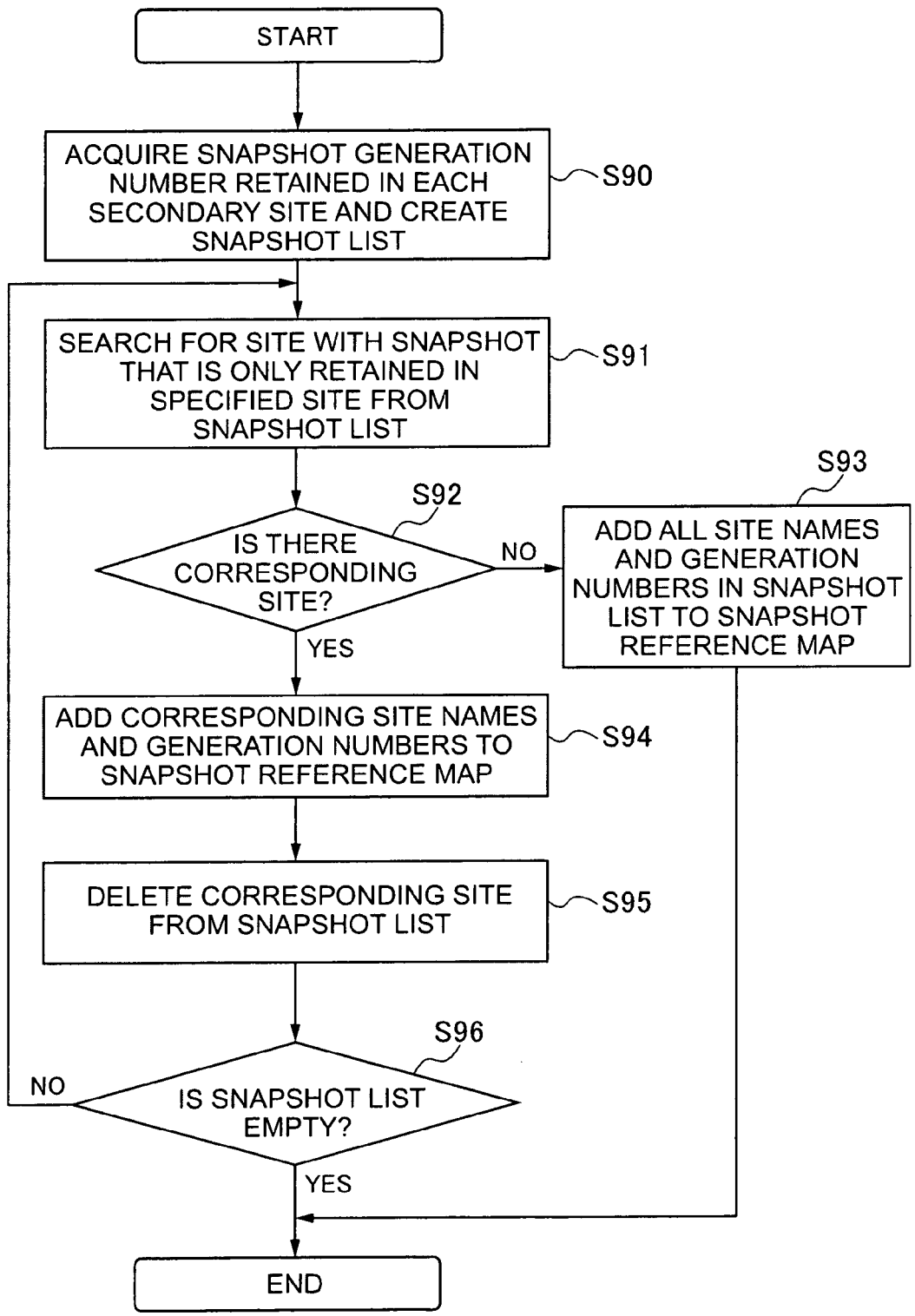
FIG. 35 is a flowchart showing the processing routine of the snapshot reference map creation/update processing.

FIG. 35 shows the processing contents of the snapshot reference map creation/update processing to be executed by the snapshot list creation processing unit 138 (FIG. 28) of the secondary site-side file sharing program 110 (FIG. 28) of the secondary NAS apparatus 16 in relation to the creation or update of the snapshot reference map M1 explained above with reference to FIG. 16.

The snapshot list creation processing unit 138 starts this snapshot list creation processing when it detects that a new snapshot has been created in the secondary site 14, and foremost accesses the respective secondary NAS apparatuses 16 in order to acquire the generation number of the snapshots that are retained in that secondary NAS apparatus 16, and thereby creates the snapshot list 300 (FIG. 11) (S90).

Subsequently, the snapshot list creation processing unit 138 searches for a secondary site 14 including a snapshot that only exists in one secondary site 14 from the snapshot list 300 (S91), and determines whether such a secondary site 14 exists based on the search result (S92).

If the snapshot list creation processing unit 138 obtains a negative result in the foregoing determination, it registers the site name of all secondary sites 14 registered in the snapshot list 300 and the generation number of the snapshots existing in that secondary site 14 in the snapshot reference map M1 (S93), and thereafter ends this snapshot reference map creation/update processing.

Meanwhile, if the snapshot list creation processing unit 138 obtains a positive result in the determination at step S92, it adds the site name of the corresponding secondary site 14 and the generation number of the generation of the snapshot existing only in that secondary site 14 to the snapshot reference map M1 (S94), and thereafter deletes the entry of that secondary site 14 from the snapshot list 300 (S95).

Subsequently, the snapshot list creation processing unit 138 determines whether the snapshot list 300 is empty (S96). If the snapshot list creation processing unit 138 obtains a negative result in the foregoing determination, it returns to step S91, and thereafter repeats the processing of step S91 to step S96 until it obtains a positive result at step S96.

When the snapshot list creation processing unit 138 eventually obtains a positive result at step S96 as a result of the snapshot list 300 becoming empty, it ends this snapshot reference map creation/update processing.

(4) Effect of Present Embodiment

As described above, in the present embodiment, since the monitoring server 20 collects the resource usage information from the primary NAS apparatus 12 and the respective secondary NAS apparatuses 16, determines the operational purpose of the respective secondary sites 14 during the remote copy based on the collected resource usage information, operates the respective secondary sites 14 as a backup-target site or a mirror site according to the determination result, and controls the transfer of the differential data as the remote copy-target data in accordance with the respective operations, it is possible to improve the operation efficiency of the plurality of secondary sites 14.

(5) Other Embodiments

Although the foregoing embodiment explained a case of applying the present into the remote copy system that is configured as shown in FIG. 1, the present invention is not limited thereto, and may also be broadly applied to other remote copy systems of various configurations.

Moreover, although the foregoing embodiment explained a case where the monitoring server 20 determines the operational purpose of the secondary site 14 based on the tendency of the access frequency (access frequency to the secondary NAS apparatus 16), the number of users permitted to access the secondary NAS apparatus 16, the type of data retained in the primary NAS apparatus 12 and the secondary NAS apparatus 16, and the usage status of the primary NAS apparatus 12 as explained above with reference to FIG. 8, the present invention is not limited thereto, and the operational purpose of the secondary site 14 may be determined based on at least one of the above, or the operational purpose of the secondary site 14 may be determined based on the tendency of other access frequencies.

Furthermore, although the foregoing embodiment explained a case of defining the switching condition definition information as shown in FIG. 18, the present invention is not limited thereto, and other conditions may also be defined.

In addition, although the foregoing embodiment explained a case where the number of representative secondary sites is decided based on the differential data amount to be transferred and the current resource availability status, the present invention is not limited thereto, and the number of representative secondary sites may be decided based other conditions in addition to or in substitute for the foregoing conditions.

Moreover, although the foregoing embodiment explained a case of defining the size of the resource availability status as shown in FIG. 20, the present invention is not limited thereto, and other definitions may also be applied.

What is claimed is:

1. A remote copy system, comprising:
    a first storage apparatus disposed in a primary site configured to provide to a host computer a first volume to be used for reading and writing data, and periodically or randomly to create a snapshot of the first volume;
    a second storage apparatus disposed respectively in one or more secondary sites configured to restore a data image of the first volume to a second volume in a self-apparatus based on differential data between the snapshots that are transferred from the first storage apparatus; and
    a monitoring server configured to control a transfer mode of the differential data to be transferred from the first storage apparatus to the second storage apparatus,
    wherein the monitoring server:
        collects resource information representing a resource usage status from the first and second storage apparatuses;
        decides the transfer mode of the differential data to be transferred from the first storage apparatus to the second storage apparatus based on the collected resource information; and
        controls the first and second storage apparatuses so as to transfer the differential data from the first storage apparatus to the second storage apparatus according to the decided transfer mode;
    wherein the monitoring server determines whether an operational purpose of the secondary site is a backup purpose or a mirror site purpose based on the collected resource information, and controls the first and second storage apparatuses so as to transfer the differential data from the first storage apparatus to the second storage apparatus based on a transfer mode according to the operational purpose of the secondary site based on the determination result; and
    wherein the monitoring server determines the operational purpose of the secondary site based on at least one among an access frequency to the second storage apparatus, number of users permitted to access the second storage apparatus, type of data retained in the first and second storage apparatuses, and usage status of the first storage apparatus which are recognized based on the resource information.

2. The remote copy system according to claim 1, wherein the monitoring server decides, among the plurality of secondary sites, representative secondary sites in a quantity according to the data amount of the differential data to be transferred from the first storage apparatus to the second storage apparatus and a resource availability status in the first and second storage apparatuses that is recognized based on the collected resource information of the first and second storage apparatuses, and controls the first and second storage apparatuses so as to transfer the differential data from the first storage apparatus to the second storage apparatus installed in the decided representative secondary site, and transfer the differential data from the second storage apparatus installed in the representative secondary site to the second storage apparatus installed in the secondary site other than the representative secondary site.

3. The remote copy system according to claim 2, wherein, if the monitoring server determines that the operational purpose of the secondary site is a backup purpose, it controls the first and second storage apparatuses so as to distribute and transfer each of the partitioned differential data, which is obtained by partitioning the differential data to be transferred from the first storage apparatus to the second storage apparatus by the number of secondary sites, to the second storage apparatus installed in each of the representative secondary sites.

4. The remote copy system according to claim 2, wherein, if the monitoring server determines that the operational purpose of the secondary site is a mirror site purpose, it controls the first and second storage apparatuses so as to transfer differential data, from which the first storage apparatus decimated data in snapshot units as needed, to the second storage apparatus installed in each of the representative secondary sites.

5. The remote copy system according to claim 4,
wherein the monitoring server decides the number of snapshot generations to be decimated according to the unused resource amount of the second storage apparatus for each of the second storage apparatus installed in each of the representative secondary sites.

6. The remote copy system according to claim 1,
wherein the monitoring server controls the first and second storage apparatuses so as to switch the transfer mode of the differential data from the first storage apparatus to the second storage apparatus to another transfer mode as needed based on at least the number of users permitted to access the first storage apparatus and the number of users permitted to access the second storage apparatus, and the ratio of files of a specific format in relation to all files stored in the first storage apparatus.

7. A remote copy control method in a remote copy system including a first storage apparatus disposed in a primary site configured to provide to a host computer a first volume to be used for reading and writing data, and periodically or randomly to create a snapshot of the first volume, and a second storage apparatus disposed respectively in one or more secondary sites configured to restore a data image of the first volume to a second volume in a self-apparatus based on differential data between the snapshots that are transferred from the first storage apparatus, comprising:
 a first step of collecting resource information representing a resource usage status from the first and second storage apparatuses;
 a second step of deciding a transfer mode of the differential data to be transferred from the first storage apparatus to the second storage apparatus based on the collected resource information; and
 a third step of controlling the first and second storage apparatuses so as to transfer the differential data from the first storage apparatus to the second storage apparatus according to the decided transfer mode;
 wherein, at the second step, whether an operational purpose of the secondary site is a backup purpose or a mirror site purpose is determined based on the collected resource information, and the transfer mode is decided according to the operational purpose of the secondary site based on the determination result; and
 wherein the operational purpose of the secondary site is determined based on at least one among an access frequency to the second storage apparatus, number of users permitted to access the second storage apparatus, type of data retained in the first and second storage apparatuses, and usage status of the first storage apparatus which are recognized based on the resource information.

8. The remote copy control method according to claim 7,
wherein, at the second step, among the plurality of secondary sites, representative secondary sites are decided in a quantity according to the data amount of the differential data to be transferred from the first storage apparatus to the second storage apparatus and a resource availability status in the first and second storage apparatuses that is recognized based on the collected resource information of the first and second storage apparatuses,
 wherein, at the third step, the first and second storage apparatuses are controlled so as to transfer the differential data from the first storage apparatus to the second storage apparatus installed in the decided representative secondary site, and
 wherein the remote copy control method further comprises:
 a fourth step of controlling the first and second storage apparatuses so as to transfer the differential data from the second storage apparatus installed in the representative secondary site to the second storage apparatus installed in the secondary site other than the representative secondary site.

9. The remote copy control method according to claim 8,
wherein, at the third step, if it is determined that the operational purpose of the secondary site is a backup purpose, the first and second storage apparatuses are controlled so as to distribute and transfer each of the partitioned differential data, which is obtained by partitioning the differential data to be transferred from the first storage apparatus to the second storage apparatus by the number of secondary sites, to the second storage apparatus installed in each of the representative secondary sites.

10. The remote copy control method according to claim 8,
wherein, at the third step, if it is determined that the operational purpose of the secondary site is a mirror site purpose, the first and second storage apparatuses are controlled so as to transfer differential data, from which the first storage apparatus decimated data in snapshot units as needed, to the second storage apparatus installed in each of the representative secondary sites.

11. The remote copy control method according to claim 10,
wherein t the number of snapshot generations to be decimated is decided according to the unused resource amount of the second storage apparatus for each of the second storage apparatus installed in each of the representative secondary sites.

12. The remote copy control method according to claim 7,
wherein, at the second step, the first and second storage apparatuses are controlled so as to switch the transfer mode of the differential data from the first storage apparatus to the second storage apparatus to another transfer mode as needed based on at least the number of users permitted to access the first storage apparatus and the number of users permitted to access the second storage apparatus, and the ratio of files of a specific format in relation to all files stored in the first storage apparatus.

* * * * *